(12) United States Patent
Dai et al.

(10) Patent No.: US 9,514,904 B2
(45) Date of Patent: Dec. 6, 2016

(54) ELECTRIC EXCITATION PERMANENT MAGNET SWITCH, ELECTRIC EXCITATION PERMANENT MAGNET SWITCHED RELUCTANCE MOTOR AND ELECTRIC EXCITATION METHOD

(75) Inventors: Shanshan Dai, Jiangsu (CN); Xiaofeng Lu, Jiangsu (CN)

(73) Assignee: DAI, SHANSHAN, Nanjing (CN)

( * ) Notice: Subject to any disclaimer, the term of this patent is extended or adjusted under 35 U.S.C. 154(b) by 406 days.

(21) Appl. No.: 14/008,251

(22) PCT Filed: Mar. 29, 2012

(86) PCT No.: PCT/CN2012/000407
§ 371 (c)(1),
(2), (4) Date: Nov. 13, 2013

(87) PCT Pub. No.: WO2012/129965
PCT Pub. Date: Oct. 4, 2012

(65) Prior Publication Data
US 2014/0055069 A1 Feb. 27, 2014

(30) Foreign Application Priority Data

Mar. 30, 2011 (CN) .......................... 2011 1 0077614

(51) Int. Cl.
*H02P 25/08* (2016.01)
*H02K 1/06* (2006.01)
(Continued)

(52) U.S. Cl.
CPC .............. *H01H 36/00* (2013.01); *H02K 21/44* (2013.01); *H02K 41/033* (2013.01); *H02K 2201/15* (2013.01)

(58) Field of Classification Search
CPC ........ H02P 25/08; H02P 1/163; H02P 3/065; H02P 9/40; H02P 2203/01; H02K 21/042; H02K 21/38; H02K 1/17; H02K 37/20; H02K 1/148; H02K 21/44; H02K 41/033; H02K 2201/15; H01H 36/00

USPC ..... 310/180, 181, 68 R, 49.28, 49.29, 49.43, 310/216.075, 216.107; 218/701, 254, 218/254.1, 493, 498, 494; 335/207
See application file for complete search history.

(56) References Cited

U.S. PATENT DOCUMENTS 5,327,069 A * 7/1994 Radun et al. .......... H02K 29/12
318/400.13
5,365,137 A * 11/1994 Richardson et al. .. H02K 1/141
310/112

(Continued)

FOREIGN PATENT DOCUMENTS

| CN | 101764492 | * | 6/2010 |
| CN | 101764492 A | | 6/2010 |
| JP | 2005-124309 | * | 5/2005 |

OTHER PUBLICATIONS

International Preliminary Report on Patentability issued in International Application No. PCT/CN2012/000407 dated Oct. 1, 2013.

*Primary Examiner* — Terrance Kenerly
*Assistant Examiner* — Ahmed Elnakib
(74) *Attorney, Agent, or Firm* — Oliff PLC

(57) ABSTRACT

Two magnetic poles of a permanent magnet of a permanent magnet switch and the two ends of an iron core wound with an excitation coil are connected to each other with the soft magnet having a salient pole. A motor uses the switch as the basic component of the stator and rotor, with two magnetic salient poles of each component being arranged axially, wherein the salient pole of the stator component and that of the rotor component are arranged in an opposite manner with an air gap, the excitation coil of the stator component and the rotor component at the symmetric axis position is taken as a phase line to access an excitation control power supply after serial connection or parallel connection. Electric excitation is carried out on the combined motor formed by shaft connection and rotation dislocation among single motors and the stator component in a bi-phase way simultaneously.

2 Claims, 12 Drawing Sheets

(51) Int. Cl.
*H02K 37/00* (2006.01)
*H01H 36/00* (2006.01)
*H02K 21/44* (2006.01)
*H02K 41/03* (2006.01)

(56) References Cited

U.S. PATENT DOCUMENTS

| | | | | |
|---|---|---|---|---|
| 5,652,493 A | * | 7/1997 | Hendershot, Jr. | H02K 19/103 318/400.17 |
| 5,969,454 A | * | 10/1999 | Pengov et al. | H02K 19/103 310/162 |
| 6,097,126 A | * | 8/2000 | Takura | H02K 19/103 310/166 |
| 6,188,159 B1 | * | 2/2001 | Fan | H02K 1/141 310/216.026 |
| 2005/0275303 A1 | * | 12/2005 | Tetmeyer | H02K 19/103 310/166 |
| 2010/0123426 A1 | * | 5/2010 | Nashiki et al. | H02K 1/12 318/701 |
| 2012/0091940 A1 | * | 4/2012 | Nashiki et al. | H02K 19/103 318/701 |
| 2014/0062379 A1 | * | 3/2014 | Dai et al. | H02P 25/08 318/701 |

* cited by examiner

US 9,514,904 B2

ELECTRIC EXCITATION PERMANENT MAGNET SWITCH, ELECTRIC EXCITATION PERMANENT MAGNET SWITCHED RELUCTANCE MOTOR AND ELECTRIC EXCITATION METHOD

FIELD OF THE INVENTION

This invention is related to the technical field of switched reluctance motors, especially an electric excitation permanent magnet switch and the switched reluctance motor formed by using this electric excitation permanent magnet switch and its electric excitation method.

BACKGROUND OF THE INVENTION

Existing switched reluctance motors are in the doubly salient structure, the rotor is formed by laminating silicon steel sheets, with neither winding nor permanent magnet, poles of the stator are wound with exciting windings, the exciting current is input into the stator exciting windings, so that stator salient poles and rotor salient poles interact to produce a torque. The switched reluctance motor operates on the "minimum reluctance principle", after energizing, the magnetic path has the trend of changing to the minimum reluctance. When the rotor salient poles and stator salient poles are dislocated, the air gap is big, and so is the reluctance; once the stator exciting windings are energized, magnetic pulling force is produced on the rotor salient poles, reducing both the air gap and reluctance in the magnetic path. Meanwhile, a continuous rotating torque can be realized by switching the energizing phase sequence of the stator exciting windings with an electronic switch in a certain logic relation. As there is neither exciting winding nor permanent magnet on the rotor of switched reluctance motor of this structure, the structure is simple and operation is reliable. However, because neither the stator nor the rotor has permanent magnet used for excitation, higher electric excitation power is required to obtain high output torque, therefore the performance to volume ratio of this type of motors is restricted, and there is fairly high driving energy consumption.

Recently many project items of switched reluctance motors for using mixed excitation have emerged, these new technical results have greatly improved and upgraded the performance and application value of switched reluctance motors. However, the structures of this type of motors have not broken the practice of traditional switched reluctance motors wherein the stator housing and rotor iron core are used to form a magnetic path to produce torque, this structure of integral magnetic conduction not only involves long magnetic path and high loss, magnetic interference and flux leakage cannot be avoided between the magnetic salient poles, these factors have affected and hindered the full performance of the excellent properties of switched reluctance motors, and restricted their extensive use. Also, existing switched reluctance motors have the disadvantages of high torque fluctuation and noise, which are unfavorable to the service life of drive parts, in short, the indicators of existing switched reluctance motors, such as output torque, energy consumption and power to volume ratio, are not quite ideal.

CONTENT OF THE INVENTION

The purpose of this invention is to provide an electric excitation permanent magnet switch that can make full use of the inherited magnetic energy potential of permanent magnet, and to form a new type switched reluctance motor with this electric excitation permanent magnet switch as a basic component, also the electric excitation method of this type of switched reluctance motor is provided.

To realize the afore-said purpose of invention, this invention first provides an electric excitation permanent magnet switch, which is formed by the permanent magnet, soft magnet, iron core and exciting coil, the two magnetic poles of the permanent magnet and both ends of the iron core wound with exciting coils are respectively connected via two soft magnets, and salient poles are provided on the two soft magnets. The permanent magnet forms an enclosed magnetic circuit for the flux of the permanent magnet via the soft magnet and iron core, in static conditions with matching magnetic circuit parameters, when oriented current is admitted into the exciting coil, because the permanent magnet and coil core in the electric excitation permanent magnet switch are arranged with a minimal distance, and the magnetic output lead-out terminal (magnetic salient plate) of that electric excitation permanent magnet switch is connected in parallel with a circuit longer than the enclosed magnetic circuit formed by the permanent magnet and soft magnet and coil core, also with an air gap or assembling gap, therefore the reluctance at the output load side is greater than that of the shorted circuit, therefore in static state, the field strength on the magnetic salient pole is quite weak or is 0, with no force acting on the load, is in a magnetic inactive state, and is automatically turned inactive without any external acting force, on the salient poles of the soft magnet, a superimposed field can be obtained, this composite field is a superimposed field of the field generated by the exciting coil admitted with current and the dynamic field formed by excited the permanent magnet static field. The "electric excitation permanent magnet switch" can be used to form a switched reluctance motor, the two magnetic salient plates of the soft magnet of each "electric excitation permanent magnet switch" are arranged axially along the motor rotating shaft, i.e. the two magnetic salient poles of the "electric excitation permanent magnet switch" are arranged parallel with the rotating shaft, with short magnetic path, low magnetic loss, and easy to be structured and arranged. Moreover, it also allows cutting the short-circuited magnetic lines in restoring the short-circuit, and the induced electromotive force produced by coils can be recovered for use again.

In the technical plan of the afore-said electric excitation permanent magnet switch, the said two soft magnet salient poles are located between the two ends of the permanent magnet and two ends of the iron core with exciting coils, the protruding direction of the soft magnet salient poles are identical, and the protruding direction of the soft magnet salient pole is vertical to the plane of the permanent magnet and the iron core. (As shown in Attached FIG. 1)

In the technical plan of the afore-said electric excitation permanent magnet switch, the protruding directions of the said soft magnet salient poles are opposite to each other, and the protruding directions of the soft magnet salient poles are on the plane of the permanent magnet and the iron core (As shown in Attached FIG. 2) or the protruding directions of the soft magnet salient poles are parallel to the plane of the permanent magnet and the iron core (As shown in Attached FIG. 3).

In the technical plan of the afore-said electric excitation permanent magnet switch, the said two soft magnet salient poles are located close to the two ends of the iron core with exciting coils, the protruding directions of the soft magnet salient poles are parallel to the plane of the permanent magnet and the iron core, the protruding direction of the soft magnet salient pole are identical (As shown in Attached FIG. 4) or opposite (as shown in Attached FIG. 5).

The working principle of the afore-said electric excitation permanent magnet switch is as follows:

(1) When no current is admitted into the exciting coil, the two magnetic poles of the permanent magnet are magnetically short-circuited via the iron core enclosed circuit in the soft magnet and exciting coils, and the two salient poles on the soft magnet show no magnetic polarity. (As shown in Attached FIG. 6) That is, in the static state, with matching magnetic circuit parameters, permanent magnet flux is in a magnetically short-circuited state, i.e. the field strength at the lead-out terminal of the soft magnet salient poles is quite weak or 0. The salient poles of the soft magnet will not produce magnetic acting force on its surrounding magnetic sensing articles.

(2) When forward current is admitted into the exciting coil, the field orientation and permanent magnet field orientation produced in the exciting coil are reversed (opposite) in the enclosed magnetic circuit, at this time, the field strength superimposed by the permanent magnet field and exciting field will be produced on the two salient poles on the soft magnet. (As shown in Attached FIG. 7) The salient poles of the soft magnet will produce a magnetic acting force on its surrounding magnetic sensing articles, when the salient poles of the two electric excitation permanent magnet switch soft magnets are arranged opposite to each other in pairs, the two electric excitation permanent magnet switches provide a flux enclosed circuit to each other, if there is a deviation of the centers of salient poles of the two electric excitation permanent magnet switches, torsion will produce, so that the two electric excitation permanent magnet switches are in the stable state with the shortest magnetic circuit. When the current admitted into the exciting coil changes from forward to zero, the permanent magnet will quickly restore the iron core enclosed circuit via the soft magnet and exciting coil to a magnetically short-circuited state, and this process will induce in the exciting coil a potential, which can be collected and utilized.

(3) When a reverse current is admitted into the exciting coil, the field produced by the exciting coil and the permanent magnet field are in the same orientation in the magnetic circuit, and this will enhance the effect of short-circuit, the two salient poles on the soft magnet will not show magnetic polarity. The salient poles of the soft magnet will not produce magnetic acting force on its surrounding magnetic sensing articles. (As shown in Attached FIG. 8) When suitable reverse current is admitted into the exciting coil, the hysteresis effect of the soft magnet can be eliminated.

When forward current is admitted cyclically into the exciting coil of this electric excitation permanent magnet switch, a field strength will be produced cyclically at the two salient poles of the soft magnet of this electric excitation permanent magnet switch, when the air gap between the two salient poles of the soft magnet and their surrounding magnet sensing substance is very small, the magnetic energy of the magnetic salient poles of the soft magnet can penetrate the air gap, acting cyclically on the external magnet sensing substance and doing work.

At the moment when the current admitted into the exciting coil changes from forward to zero, the permanent magnet will induce a potential in the exciting coil in the course of restoring the shortest magnetic circuit, and this potential can be guided and collected into accumulating devices and be used.

In the afore-said technical plan for electric excitation permanent magnet switch, the said soft magnet and iron core are formed by laminated silicon steel sheets or pure electrical iron.

To realize the afore-said purpose of invention, this invention provides a switched reluctance motor with the electric excitation permanent magnet switch as basic component, its construction including the rotor, stator and excitation control power source, wherein: the stator of this motor is formed by the motor housing and an even number of electric excitation permanent magnet switch components, the said electric excitation permanent magnet switch component is formed by the permanent magnet, soft magnet, iron core and exciting coils, the two magnetic poles of the permanent magnet and both ends of the iron core wound with exciting coils are respectively connected via two soft magnets, on the two soft magnets are provided with salient poles, these electric excitation permanent magnet switch components are arranged annularly at equal spacing along the motor housing inner wall, these electric excitation permanent magnet switch components are mutually in a magnetically isolated state, and the two magnetic salient poles of each electric excitation permanent magnet switch component are arranged axially, the rotor of this motor is formed by the rotating shaft and an even number of strip-shaped iron cores, the even number of strip-shaped iron cores are arranged radially at equal spacing along the rotating shaft, each strip-shaped iron core has two salient poles, these two salient poles are arranged axially, the electric excitation permanent magnet switch components on the stator magnetic salient pole and rotor strip-shaped iron core salient pole are arranged opposite to each other, with an air gap between them, with the rotating shaft as symmetric axis, the exciting coils of the two stator electric excitation permanent magnet switch components at axially symmetric positions are taken as a phase to access an excitation control power source after serial connection or parallel connection.

In the afore-said technical plan of switched reluctance motor, there are 6 or 8 or 10 or 12 or 14 or 16 or 18 electric excitation permanent magnet switch components on the said stator, and corresponding one by one to the number of electric excitation permanent magnet switch components on the afore-said stator, there are 4 or 6 or 8 or 10 or 12 or 14 or 16 corresponding rotor strip-shaped iron cores. The seven combined structures of the number of said permanent magnet switch components on stator and number of strip-shaped iron cores on rotor, correspondingly form different stepping angles of 30 degree, 15 degree, 9 degree, 6 degree, 4.28 degree, 3.21 degree and 2.5 degrees for the switched reluctance motor.

For the afore-said technical plan of switched reluctance motor, this invention provides a bi-phase electric excitation method, wherein the excitation control power source supplies power to M phase lines on the stator in sequence and cyclically, with 12 electric excitation permanent magnet switch components on stator, M is 6. Now it is assumed that the period of the excitation control power source supplying power to phase 1 of the stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of the excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, and so on, the period of the excitation control power source supplying power to phase M of stator switch component is $TM_{stator}$, the start time of the excitation control power source supplying power to phase M of stator switch component is $tM_{stator\ on}$, the end time of the excitation control power source supplying power to phase M of stator switch component is $tM_{stator\ off}$, in the period $TM_{stator}$ when the excitation control power source supplies power to phase M of the stator switch component, the excitation control power source stops power supply to phase (M−1), the moment when the excitation control power source stops power supply to phase (M−1) is $t(M-1)_{stator\ off}$, while the moment of the excitation control power source starting the power supply to phase 1 is $t1_{stator\ on}$, moment $t1_{stator\ on}$ and moment $t(M-1)_{stator\ off}$ are both within the time period $TM_{stator}$, and between $t1_{stator\ on}$ and $t(M-1)_{off}$ there is a time difference $\Delta t_{stator}$, i.e. $\Delta t_{stator} = t(M-1)_{stator\ off} - t1_{stator\ on}$, only when $\Delta t_{stator}$ is not zero, the excitation control power source simultaneously supplies power to the three adjacent phases of stator switch components, when $\Delta t_{stator}$ is zero, the excitation control power source only simultaneously supplies power to the two adjacent phases of stator switch components, the position sensors send the position signals of stator and rotor to the excitation control power source, which controls the start and end moment of supplying power to each phase line of the stator, thus controlling the running status of the motor.

Attached FIGS. 9 and 10 show a schematic diagram of motor structure, where in there are 8 electric excitation permanent magnet switch components on the stator, with a total of 8×2 magnetic salient poles of electric excitation permanent magnet switch components on the stator, and there are 6 rotor strip-shaped iron cores, with a total of 6×2 salient poles on the rotor strip-shaped iron cores. The magnetic salient poles of electric excitation permanent magnet switch components on the stator and rotor salient pole are all arranged axially along the motor rotating shaft. The excitation control power source supplies forward current to a phase of the exciting coil of the electric excitation permanent magnet switch component on stator in sequence and cyclically, to produce a superimposed composite field on the magnetic salient poles of the two electric excitation permanent magnet switch components of that phase line, the magnetic salient poles at the axially symmetric positions can quickly attract the closest rotor strip-shaped iron core salient pole, to produce a magnetic torque, and at this moment, the two axially arranged magnetic salient poles of the electric excitation permanent magnet switch component, via the two axially arranged salient poles on the rotor strip-shaped iron core, form the shortest magnetic circuit, i.e. the magnetic line enters a salient pole on the rotor strip-shaped iron core from one magnetic salient pole of the electric excitation permanent magnet switch component via the air gap, and then returns from another axial salient pole of that rotor strip-shaped iron core to another magnetic salient pole of the electric excitation permanent magnet switch component via the air gap, the magnetic line goes around axially, this magnetic torque makes the salient pole radial centerline of the strip-shaped iron core on the rotor and the magnetic salient pole radial centerline of the stator electric excitation permanent magnet switch component coincide, at this moment, the power source changes the exciting current in this phase of the electric excitation permanent magnet switch component of the stator to zero, and at the same time, the excitation control power source supplies forward current to the exciting coil of the electric excitation permanent magnet switch component of another phase in sequence, the magnetic salient pole of the newly energized phase of the stator electric excitation permanent magnet switch component will attract the closest rotor strip-shaped iron core salient pole, and produce a rotating displacement of the motor rotor. This process goes on, the exciting current supplied by the excitation control power source and the magnetic energy potential of the permanent magnet act jointly, to push the rotor to rotate continually in the form of magnetic torque. The afore-said excitation control power source adopts the traditional single-phase power supply to the switched reluctance motor shown in Attached FIG. 9 and Attached FIG. 10. For the electric excitation permanent magnetic switched reluctance motor of this structure, this invention also provides another electric excitation method with simultaneous bi-phase excitation power supply, this electric excitation method has the feature that, the excitation control power source supplies power to 4 phase lines on the stator in sequence and cyclically, to describe it conveniently and clearly, as shown in Attached FIG. 11, now it is assumed that, the period of excitation control power source supplying power to phase 1 of stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, the period of excitation control power source supplying power to phase 3 of stator switch component is $T3_{stator}$, the start time of the excitation control power source supplying power to phase 3 of stator switch component is $t3_{stator\ on}$, the end time of the excitation control power source supplying power to phase 3 of stator switch component is $t1_{stator\ off}$, the period of excitation control power source supplying power to phase 4 of stator switch component is $T4_{stator}$, the start time of the excitation control power source supplying power to phase 4 of stator switch component is $t4_{stator\ on}$, the end time of the excitation control power source supplying power to phase 4 of stator switch component is $t4_{stator\ off}$, in the period $T4_{stator}$ when the excitation control power source supplies power to phase 4 of the stator switch component, the excitation control power source stops the power supply to phase 3, the moment when the excitation control power source stops the power supply to phase 3 is $t3_{stator\ off}$, while the moment when the excitation control power source starts the power supply to phase 1 is $t1_{stator\ on}$, moment $t1_{stator\ on}$ and moment $t3_{stator\ off}$ are both within the period of $T4_{stator}$, and between $t1_{stator\ on}$ and $t3_{stator\ off}$ there is a time difference $\Delta t_{stator}$, i.e. $\Delta t_{stator} = t3_{stator\ off} - t1_{stator\ on}$, or moment $t1_{stator\ on}$ is prior to moment $t3_{stator\ off}$, only when $\Delta t_{stator}$ is not zero, the excitation control power source simultaneously supplies power to the three adjacent phases of stator switch components, when $\Delta t_{stator}$ is zero, the excitation control power source only simultaneously supplies power to the two adjacent phases of stator switch component, the position sensors provided on the stator and rotor send the stator and rotor position signals to the excitation control power source, which controls the start and end moment of supplying power to each phase line of the stator, thus controlling the running status of the motor.

In the afore-said technical plan of electric excitation permanent magnet switched reluctance motor, the said stator and the said rotor form an individual motor, the rotating shafts of two or more such individual motor are axially connected, and the electric excitation permanent magnet switch components on the stator of different individual motors are at completely identical position in space, i.e. the salient pole radial centerlines of electric excitation permanent magnet switch components on the stator of different individual motors coincide, i.e. between the electric excitation permanent magnet switch components on different individual stators the rotating angle around the rotating shaft is zero, while between the salient pole radial centerlines of different individual motor rotors the rotating angle around the rotating shaft in sequence in the same direction is 0 to 30 degrees. When the rotating angle around the rotating shaft between the salient pole radial centerlines of different individual motor rotors is zero degree, the power output of the motor formed by combination of individual motors can increase by times, without the need to increase the outer diameter of the motor, and it is only necessary to increase the axial dimension of the motor. When there is a rotating angle other than zero degree around the rotating shaft between the salient pole radial centerlines of different individual motor rotor, i.e. the salient pole radial centerlines of different individual motor rotors are set at an equal rotating angle α, the amplitude of angle α here is related to the number of switch components on the motor stator and the number of strip-shaped iron cores on the rotor as well as the number of individual motors forming this combined motor. Attached FIG. 12 shows a space diagram of a combined motor, wherein there are 8 electric excitation permanent magnet switch components on each individual motor stator, with a total of 8×2 magnetic salient poles of electric excitation permanent magnet switch components on the stator, and there are 6 strip-shaped iron cores on each individual motor rotor, with a total of 6×2 salient poles on the rotor strip-shaped iron core. Attached FIG. 13, Attached FIG. 14 and Attached FIG. 15 show the rotation angular difference between the salient pole radial centerlines of the rotors of 3 individual motors, the 3 individual motors are arranged in such a way, so that the moving step length of the rotating shaft being acted upon with magnetic torque is relatively reduced, that is, the step angle α of the motor of this combined structure is one third of the step angle of an individual motor, and α is 5 degrees, so that it can realize the running effect that can be reached with more stator electric excitation permanent magnet switch components and more rotor salient poles, this can greatly reduce the manufacturing cost of motors, substantially suppress the torque fluctuation and noise, provide better speed regulation performance and stable operation, meanwhile, it can save energy, is environmental-friendly, generate less heat, increase the output power, and also lay the foundation for precision control angles of motors.

For the combined electric excitation permanent magnet switched reluctance motor shown in Attached FIG. 12, an electric excitation method is that, the excitation control power source supplies power to one of the four phase lines of the electric excitation permanent magnet switch component on the individual motor stators in sequence and cyclically, and between the moments of supplying power to the corresponding phase lines on different individual motor stators (i.e. phase 1 (A-E)$_1$ of the front individual motor and phase 1 (A-E)$_2$ of the middle individual motor and phase 1 (A-E)$_3$ of the rear individual motor is the corresponding phase line), there is a fixed time difference, this time difference is associated with the rotating angle α of rotor radial centerlines between different individual motors. This electric excitation method is a simple application of the traditional single phase line sequential and cyclic power supply method on the combined electric excitation permanent magnet switch switched reluctance motor shown in Attached FIG. 12.

For the combined electric excitation permanent magnet switched reluctance motor shown in Attached FIG. 12, another electric excitation method is "multi-phase simultaneous power supply", specifically, the excitation control power source supplies power to the four phase lines of the electric excitation permanent magnet switch components on the individual motor stators in sequence and cyclically, the excitation control power source always supplies power to the adjacent two phases of stator switch components of each individual motor simultaneously, while in the short time period of power supply commutation ($\Delta t_{stator}$ is not zero), the excitation control power source supplies simultaneously to the three adjacent phases of stator switch components, and between the moments of supplying power to the corresponding phase lines on different individual motor stators (i.e. phase 1 (A-E)$_1$ of the front individual motor and phase 1 (A-E)$_2$ of the middle individual motor and phase 1 (A-E)$_3$ of the rear individual motor are the corresponding phase line), there is a fixed time difference, this time difference is associated with the rotating angle α of rotor radial centerlines between different individual motors. The position sensors provided on the motor stators and rotors send the stator and rotor position signals to the excitation control power source, which controls the start and end moment of supplying power to the stator phase lines of the three individual motor stators, thus controlling the running status of the three individual motors.

To realize the afore-said purpose of invention, this invention provides another switched reluctance motor with the electric excitation permanent magnet switch as basic component, its construction including the rotor, stator and excitation control power source, the stator of this motor is formed by the motor housing and an even number of electric excitation permanent magnet switch components, these electric excitation permanent magnet switch components on the stator are arranged annularly at equal spacing along the motor housing inner wall, and these electric excitation permanent magnet switch components on the stator are mutually in a magnetically isolated state, the rotor of this motor is formed by the rotating shaft and an even number of electric excitation permanent magnet switch component, these electric excitation permanent magnet switch components on the rotor are arranged radially at equal spacing along the rotating shaft, and these electric excitation permanent magnet switch components on the rotor are mutually in a magnetically isolated state, the said electric excitation permanent magnet switch components on the stator and electric excitation permanent magnet switch components on the rotor are formed by the permanent magnet, soft magnet, iron core and exciting coils, the two magnetic poles of the permanent magnet and both ends of the iron core wound with exciting coils are respectively connected via two soft magnets, on the two soft magnets are provided with salient poles, and the magnetic salient poles of the two soft magnets of each electric excitation permanent magnet switch component are arranged axially, the soft magnet salient pole connected with the N pole of permanent magnet in the electric excitation permanent magnet switch components on the stator and the soft magnet salient pole connected with the S pole of the permanent magnet in the electric excitation permanent magnet switch components on the rotor are arranged opposite to each other, between the magnetic salient pole of the electric excitation permanent magnet switch components on the stator and the magnetic salient pole of the electric excitation permanent magnet switch components on the rotor is provided with an air gap, with the rotating shaft as symmetric axis, the exciting coils of the two stator electric excitation permanent magnet switch components at axially symmetric positions are taken as a phase line to access an excitation control power source after serial connection or parallel connection, and the exciting coils of the two rotor electric excitation permanent magnet switch components at axially symmetric positions of the rotating shaft are taken as a phase line to access an excitation control power source after serial connection or parallel connection.

In the afore-said technical plan of switched reluctance motor, there are 6 or 8 or 10 or 12 or 14 or 16 or 18 electric excitation permanent magnet switch components on the said stator, and corresponding one by one to the number of electric excitation permanent magnet switch components on the afore-said stator, there are 4 or 6 or 8 or 10 or 12 or 14 or 16 corresponding electric excitation permanent magnet switch components on the rotor. The seven combined structures of the number of said permanent magnet switch components on stator and number of permanent magnet switch components on rotor, correspondingly form different stepping angles of 30 degree, 15 degree, 9 degree, 6 degree, 4.28 degree, 3.21 degree and 2.5 degrees.

For the afore-said technical plan of switched reluctance motor, this invention provides a bi-phase electric excitation method, wherein the excitation control power source supplies power to M phase lines on the stator in sequence and cyclically, and concurrently, the excitation control power source supplies power to N phase lines on the rotor in sequence and cyclically, when there are 12 switch components on stator and M is 6, there are 10 switch components on the rotor and N is 5. Now it is assumed that, the period of excitation control power source supplying power to phase 1 of stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of excitation control power source supplying power to phase 2 of stator switch component is $T2_{stator}$, the start time of the excitation control power source supplying power to phase 2 of stator switch component is $t1_{stator\ on}$, the end time of the excitation control power source supplying power to phase 2 of stator switch component is $t1_{stator\ off}$, and so on, the period of excitation control power source supplying power to phase M of stator switch component is $TM_{stator}$, the start time of the excitation control power source supplying power to phase M of stator switch component is $tM_{stator\ on}$, the end time of the excitation control power source supplying power to phase M of stator switch component is $tM_{stator\ off}$, in the period $TM_{stator}$ when the excitation control power source supplies power to phase M of the stator switch component, the excitation control power source stops the power supply to phase (M−1), the moment of the excitation control power source stopping the power supply to phase (M−1) is $t(M-1)_{stator\ off}$, while the moment of the excitation control power source starting the power supply to phase 1 is $t1_{stator\ on}$, moment $t1_{stator\ on}$ and moment $t(M-1)_{stator\ off}$ are both in the time period $TM_{stator}$, and between $t1_{stator\ on}$ and $t(M-1)_{stator\ off}$ there is a time difference $\Delta t_{stator}$, $\Delta t_{stator} = t(M-1)_{stator\ off} - t1_{stator\ on}$, only when $\Delta t_{stator}$ is not zero, i.e. between the moment $t1_{stator\ on}$ and moment $t(M-1)_{stator\ off}$ the excitation control power source simultaneously supplies power to the three adjacent phases of stator switch components, when $\Delta t_{stator}$ is zero, the excitation control power source only simultaneously supplies power to the two adjacent phases of stator switch component; similarly, it is supposed that, the excitation control power source supplies power to N phase lines on the rotor in sequence and cyclically, i.e. the period of excitation control power source supplying phase 1 of rotor switch component is $T1_{rotor}$, the start time of the excitation control power source supplying phase I of rotor switch component is $t1_{rotor\ on}$, the end time of the excitation control power source supplying phase 1 of rotor switch component is $t1_{rotor\ off}$, the period of excitation control power source supplying phase 2 of rotor switch component is $T2_{rotor}$, the start time of the excitation control power source supplying phase 2 of rotor switch component is $t2_{rotor\ on}$, the end time of the excitation control power source supplying phase 2 of rotor switch component is $t2_{rotor\ off}$, and so on, the period of excitation control power source supplying phase N of rotor switch component is $TN_{rotor}$, the start time of the excitation control power source supplying phase N of rotor switch component is $tN_{rotor\ on}$, the end time of the excitation control power source supplying phase N of rotor switch component is $tN_{rotor\ off}$, in the period $TN_{rotor}$ when the excitation control power source supplies power to phase N of the rotor switch component, the excitation control power source stops the power supply to the (N−1)th phase, the moment of the excitation control power source stopping the power supply to phase (N−1) is $t(N-1)_{rotor\ off}$, while the moment of the excitation control power source starting the power supply to phase 1 is $t1_{rotor\ on}$, moment $t1_{rotor\ on}$ and moment $t(N-1)_{rotor\ off}$ are both within $TN_{rotor}$, and between $t(N-1)_{rotor\ off}$ and $t1_{rotor\ on}$, there is a time difference $\Delta t_{rotor}$, $\Delta t_{rotor} = t1_{rotor\ on} - t(N-1)_{rotor\ off}$, when $\Delta t_{rotor}$ is not zero, i.e. between the moment $t1_{rotor\ on}$ and moment $t(N-1)_{rotor\ off}$, the excitation control power source supplies power to one phase of rotor switch component, when $\Delta t_{rotor}$ is zero, the excitation control power source supplies power simultaneously to both phases of the rotor switch component, the position sensor sends stator and rotor position signal to the excitation control power source, which controls the start and end time of supplying power to various phase lines of the motor stator and rotor, thus controlling the running status of the motor.

Attached FIG. 16 and Attached FIG. 17 show the detailed structure of a switched reluctance motor, in this motor, there are 8 electric excitation permanent magnet switch components on the stator, with a total of 8×2 magnetic salient poles, and there are 6 electric excitation permanent magnet switch components on the rotor, with a total of 6×2 magnetic salient poles, with the rotating shaft as symmetric axis, the exciting coils of the two stator electric excitation permanent magnet switch components at axially symmetric positions are taken as a phase line to access an excitation control power source after serial connection or parallel connection, to form a total of four phases, the exciting coils of the two rotor electric excitation permanent magnet switch components at axially symmetric positions of the rotating shaft are taken as a phase line to access an excitation control power source after serial connection or parallel connection, to form a total of three phases.

For the electric excitation permanent magnet switched reluctance motor of the structure in Attached FIG. 16 and Attached FIG. 17, this invention provides an electric excitation method that, the excitation control power source respectively supplies power to excite respectively a single phase line of the stator and rotor of the motor, the initial positions of the stator and rotor of the motor is as shown in Attached FIG. 18. The time sequence of the excitation control power source supplying power to excite the single phase lines of the stator and rotor is as shown in Attached FIG. 19. The position sensors provided on the stator and rotor of that motor send the stator and rotor position signals to the excitation control power source, to determine the initial positions of the stator and rotor of the motor, and then this excitation control power source controls the start and end moment of supplying power to the phase lines of the stator and rotor of the motor, thus controlling the running status of the motor.

For the electric excitation permanent magnet switched reluctance motor in this structure, another electric excitation method provided by this invention is that, the excitation control power source supplies power to 4 phase lines on the stator in sequence and cyclically, and concurrently the excitation control power source also supplies power to the 3 phase lines on the rotor in sequence and cyclically, now it is assumed that, the period of excitation control power source supplying power to phase 1 of stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, the period of excitation control power source supplying power to phase 3 of stator switch component is $T3_{stator}$, the start time of the excitation control power source supplying power to phase 3 of stator switch component is $t3_{stator\ on}$, the end time of the excitation control power source supplying power to phase 3 of stator switch component is $t3_{stator\ off}$, the period of excitation control power source supplying power to phase 4 of stator switch component is $T4_{stator}$, the start time of the excitation control power source supplying power to phase 4 of stator switch component is $t4_{stator\ on}$, the end time of the excitation control power source supplying power to phase 4 of stator switch component is $t4_{stator\ off}$, in the period $T4_{stator}$, when the excitation control power source supplies power to phase 4 of the stator switch component, the excitation control power source stops the power supply to phase 3, the moment when the excitation control power source stops the power supply to phase 3 is $t3_{stator\ off}$, while the moment when the excitation control power source starts the power supply to phase 1 is $t1_{stator\ on}$, moment $t1_{stator\ on}$ and moment $t3_{stator\ off}$ are both within $T4_{stator}$, and between $t1_{stator\ on}$ and $t3_{stator\ off}$, there is a time difference $\Delta t_{stator}$, $\Delta t_{stator} = t3_{stator\ off} - t1_{stator\ on}$, only when $\Delta t_{stator}$ is not zero, i.e. between the moment $t1_{stator\ on}$ and moment $t3_{stator\ off}$, the excitation control power source simultaneously supplies power to the three adjacent phases of stator switch components, when $\Delta t_{stator}$ is zero, the excitation control power source only simultaneously supplies power to the two adjacent phases of stator switch components; similarly, it is supposed that, the excitation control power source supplies power to the 3 phase lines on the rotor in sequence and cyclically, i.e. the period of excitation control power source supplying power to phase I of rotor switch component is $T1_{rotor}$, the start time of the excitation control power source supplying power to phase 1 of rotor switch component is $t1_{rotor\ on}$, the end time of the excitation control power source supplying power to phase 1 of rotor switch component is $t1_{rotor\ off}$, the period of excitation control power source supplying power to phase 2 of rotor switch component is $T2_{rotor}$, the start time of the excitation control power source supplying power to phase 2 of rotor switch component is $t2_{rotor\ on}$, the end time of the excitation control power source supplying power to phase 2 of rotor switch component is $t1_{rotor\ off}$, the period of excitation control power source supplying power to phase 3 of the rotor switch component is $T3_{rotor}$, the start time of the excitation control power source supplying power to phase 3 of rotor switch component is $t3_{rotor\ on}$, the end time of the excitation control power source supplying power to phase 3 of rotor switch component is $t3_{rotor\ off}$, in the period $T3_{rotor}$ when the excitation control power source supplies power to the phase 3 of the rotor switch component, the excitation control power source stops the power supply to phase 2, the moment when the excitation control power source stops power supply to phase 2 is $t2_{rotor\ off}$, while the moment when the excitation control power source starts the power supply to phase 1 is $t1_{rotor\ on}$, moment $t1_{rotor\ on}$ and moment $t2_{rotor\ off}$ are both within $T3_{rotor}$, and between $t2_{rotor\ off}$ and $t1_{rotor\ on}$, there is a time difference $\Delta t_{rotor}$, $\Delta t_{rotor} = t1_{rotor\ on} - t2_{rotor\ off}$, when $\Delta_{rotor}$ is not zero, i.e. between the moment $t2_{rotor\ off}$ and moment $t1_{rotor\ on}$, the excitation control power source supplies power to one phase of rotor switch component, in other time periods, the excitation control power source supplies power simultaneously to both phases of the rotor switch components, Attached FIG. 20 is the schematic diagram of the initial positions of the stator and rotor of the switched reluctance motor in this structure, and Attached FIG. 21 shows the energizing time sequence diagram in case of two phase lines excitation of the stator and rotor of the switched reluctance motor in this structure. The position sensors provided on the stator and rotor of that motor send the stator and rotor position signals to the excitation control power source, to determine the initial positions of the stator and rotor of the motor, and then this excitation control power source controls the start and end moment of supplying power to the phase lines of the stator and rotor of the motor, thus controlling the running status of the motor. The excitation control power source supplies forward current to the exciting coils of the electric excitation permanent magnet switch components of all phases on the stator and rotor in sequence and cyclically, so that a composite field is produced on the magnetic salient poles of the electric excitation permanent magnet switch components of all phases on the stator and rotor. As the magnetic salient poles of the stator and rotor electric excitation permanent magnet switch components are arranged axially, and the magnetic salient poles are also in reversed polarity and are arranged opposite to each other, when the excitation control power source supplies a forward current into the two phases with low resistance, the composite fields produced on the magnetic salient poles of the stator and rotor electric excitation permanent magnet switch components are in the same orientation, and enhance mutually, to form an enclosed magnetic circuit with an air gap, and produce a magnetic torque, so that the rotor rotating angle deflects in the direction of straightening the magnetic line and with the shortest magnetic circuit, at this moment, the excitation control power source supplies the forward current to the exciting coils of another phase of the stator electric excitation permanent magnet switch component of another phase and the exciting coils of the rotor electric excitation permanent magnet switch component of another phase, the energized magnetic salient poles on the rotor will be attracted by the energized magnetic salient poles on the stator, to produce a rotating displacement, this process goes on cyclically, the excitation electric energy supplied by the excitation control power source, together with the magnetic energy potential of the permanent magnet in the stator and rotor, pushes the rotor to rotate continually in the form of magnetic torque. As electric excitation permanent magnet switch components to cut off current of the own magnetic circuits are provided in both the stator and rotor, the reverse torque between the stator and rotor during motor operation has been thoroughly eliminated, and in the meantime, the field strength of the air gas is greatly enhanced, thus substantially increasing the output torque. This, plus the numerical control electric excitation power source with bi-phase conducting and commutation time difference processing, also solved such serious defects of torque fluctuation and noise with traditional switched reluctance motors while increasing the output power and the power to volume ratio, achieving steady and reliable speed regulation and operation of motors. The performance to price ratio has been increased while the volume and weight reduced. Furthermore, the excitation control power source supplies forward current to the exciting coils of two phases of electric excitation permanent magnet switch components respectively on the stator and rotor in time sequence, can suppress the pulsation of motor output torque, realize more stable transition of output torque and increase the output torque at the same time, on the other hand, the subdivision of conducting angles can further reduce the step angles of stator and rotor, or reducing the angles of the step motor, thus laying the foundation for precision control of motors.

In the technical plan for the afore-said electric excitation permanent magnet switched reluctance motor, the said stator and the said rotor form an individual motor, the rotating shafts of two or more such individual motors are axially connected, so that the electric excitation permanent magnet switch components on the stators of different individual motors are at completely identical position in space, i.e. the salient pole radial centerlines of electric excitation permanent magnet switch components on the stators of different individual motors coincide axially, i.e. between the electric excitation permanent magnet switch components on different individual stators the rotating angle around the rotating shaft is zero, while between the salient pole radial centerlines of the electric excitation permanent magnet switch components on rotors of different individual motors the rotating angle around the rotating shaft in sequence in the same direction is 0 to 30 degrees; or the electric excitation permanent magnet switch components on rotors of different individual motors are at completely identical position in space, i.e. the salient pole radial centerlines of the electric excitation permanent magnet switch components on the rotors of different individual motors coincide axially, i.e. between electric excitation permanent magnet switch components on different individual rotors the rotating angle around the rotating shaft is zero, while between the salient pole radial centerlines of electric excitation permanent magnet switch components on the stators of different individual motor the rotating angle around the rotating shaft in sequence in the same direction is 0 to 30 degrees. Attached FIG. 22 is the structural schematic diagram of the axial connection of the rotating shafts of three individual motors. In this structure, in the three individual motors, there are 8 electric excitation permanent magnet switch components on the stators, with a total of 8×2 magnetic salient poles, and there are 6 electric excitation permanent magnet switch components on the rotors, with a total of 6×2 magnetic salient poles. In the combined switched reluctance motor of this structure, the three individual motors are arranged in different layers with an angular difference between them, so that the step angle of 15 degrees originally completed by the individual motor in one layer is divided into three steps, the step angle α of the combined switched reluctance motor of this structure is one third the step angle of an individual motor in a single layer, and α is 5 degrees.

For the combined switched reluctance motor shown in Attached FIG. 22, this invention provides an electric excitation method that: the excitation control power source respectively supplies power to a single phase line of the stator and rotor in the three individual motors, each individual motor supplies power to a single phase of the stator and a single phase of the rotor in sequence and cyclically, but there is a fixed time difference between the power supply moment for the corresponding phase lines on the stators (i.e. phase 1 $(A-E)_1$ of the front individual motor and phase 1 $(A-E)_2$ of the middle individual motor and phase 1 $(A-E)_3$ of the rear individual motor are the corresponding phase lines) of different individual motors, and there is a fixed time difference between the power supply moment for the corresponding phase lines on the rotors (i.e. phase 1 $(I\ IV)_1$ of the front individual motor and phase 1 $(I\ IV)_2$ of the middle individual motor and phase 1 $(I\ IV)_3$ of the rear individual motor are the corresponding phase lines) of different individual motors, the power supply time difference of corresponding phase lines of stators and rotors of different individual motors is associated with the rotating angle α between the rotor radial centerlines of different individual motors. The position sensors provided on the stator and rotor of that motor send the stator and rotor position signals to the excitation control power source, to determine the initial positions of the stator and rotor of the motor, and then this excitation control power source controls the start and end moment of supplying power to the phase lines of the stator and rotor of the motor, thus controlling the running status of the motor.

For the combined switched reluctance motor shown in Attached FIG. 22, another electric excitation method provided by this invention is that, the excitation control power source supplies power to the four phase lines on the stator and three phase lines on the rotor of each individual motor in sequence and cyclically, the initial positions of the stator and rotor of the front individual motor is as shown in Attached FIG. 20, there is an angular difference a between the rotor initial position in the middle individual motor and the rotor initial position in the front individual motor, and there is also an angular difference a between the rotor initial position in the rear individual motor and the rotor initial position in the middle individual motor, the power supply time sequence for the stator and rotor exciting coils of individual motors are as shown in Attached FIG. 21. Each individual motor supplies power to a single phase of the stator and a single phase of the rotor in sequence and cyclically, but there is a fixed time difference between the power supply moment for the corresponding phase lines on the stators (i.e. phase 1 $(A-E)_1$ of the front individual motor and phase 1 $(A-E)_2$ of the middle individual motor and phase 1 $(A-E)_3$ of the rear individual motor are the corresponding phase lines) of different individual motors, and there is a fixed time difference between the power supply moment for the corresponding phase lines on the rotors (i.e. phase 1 $(I\ IV)_1$ of the front individual motor and phase 1 $(I\ IV)_2$ of the middle individual motor and phase 1 $(I\ IV)_3$ of the rear individual motor are the corresponding phase lines) of different individual motors, the power supply time difference of corresponding phase lines of stators and rotors of different individual motors is associated with the rotating angle α between the rotor radial centerlines of different individual motors. In the short period of power supply commutation of stator switch component power source ($\Delta t_{stator}$ is not zero), the excitation control power source supplies power simultaneously to the three adjacent phases of the stator switch components of the same individual, and in the short period of power supply commutation of rotor switch component power source ($\Delta t_{rotor}$ is not zero), the excitation control power source only supplies power to one phase of the rotor switch component, as shown in Attached FIG. 21. The position sensors provided on the stators and rotors of the three individual motors send the stator and rotor position signals to the excitation control power source, which controls the start and end moment of supplying power to the phase lines of the stators and rotors of the three individual motor, thus controlling the running status of the motors. This electric excitation and control method enables the motors to run quite steadily and reliably, at the same time, it increased the power output and also laid the foundation for precise angle control of motors. This technical plan of subdivision of step angles in conjunction with simultaneous power supply to adjacent phases will lay a solid foundation for the realization and development of power switched reluctance drive motors with high control precision requirements and excellent programmed control performance.

When the electric excitation permanent magnet switch components on different individual motor stators are at completely identical space positions, i.e. the rotating angle around the rotating shaft between electric excitation permanent magnet switch components on different individual motor stators is zero degree, and the rotating angle around the rotating shaft between electric excitation permanent magnet switch components on different individual motor rotors is also zero degree, the power output of the motor can increase by times, without the need to increase the outer diameter of the motor, and it is only necessary to increase the axial dimension of the motor.

When the electric excitation permanent magnet switch components on different individual motor rotors are at completely identical space positions, i.e. the rotating angle around the rotating shaft between electric excitation permanent magnet switch components of different individual motor rotors is zero degree, while the rotating angle around the rotating shaft between the electric excitation permanent magnet switch components of different individual motor stators is not zero degree, and the switch components on the stators are arranged at incremental equal division of step rotating angular difference, the displacement step length of the rotating shaft in each action of magnetic torque can also be relatively shortened, thereby obtaining the running effect with more stator electric excitation permanent magnet switch components and more rotor salient poles, and this can greatly reduce the manufacturing cost of motors.

The advantages of this invention are:

1. The electric excitation permanent magnet switch can make effective use of the inherited magnetic energy potential of the permanent magnet, so that a magnetic field greater than that produced by the exciting current can be obtained on the salient poles of the switch, when current is admitted into the exciting coil, the static permanent magnet field is excited into a dynamic changing field. When the current to the exciting coil is cut off and the exciting current changes to zero, there is almost no residual magnetism on the magnetic salient poles of the electric excitation permanent magnet switch, the magnetic line produced by the permanent magnet almost all returned from N pole to S pole via the enclosed circuit formed by the soft magnet and the iron core, in a magnetic short-circuit state, when the exciting current of the electric excitation permanent magnet switch changes from forward to zero, changes of the magnetic line orientations and magnitude of the permanent magnet during magnetic short-circuit can still induce a recoverable electric potential in the exciting coils, therefore the electric excitation permanent magnet switch of this invention has the potential energy-saving effect. Furthermore, the magnetic salient poles of the soft magnets in the electric excitation permanent magnet switch are located close to the two ends of the iron core, reducing the reluctance ratio of the permanent magnet magnetic shorted circuit to the magnetic circuit of the load.

2. In the switched reluctance motor of this invention, the two magnetic salient poles N pole and S pole of each electric excitation permanent magnet switch component are arranged axially, forming an enclosed magnetic circuit parallel with the shaft direction. The magnetic circuit spacing is far less than that of the existing switched reluctance motors, therefore the loss in magnetic circuit is low and the magnetic efficiency is high, able to produce higher power.

3. The switched reluctance motor in this invention is in a special structure, i.e. the magnetic circuits are arranged axially, therefore the rotating shafts of two or more of this type of switched reluctance motors can be connected together to obtain greater output power, while the manufacturing cost can be reduced substantially. Furthermore, the rotating shafts of two or more completely identical switched reluctance motors of this type can be connected, with a given rotating angular difference between the motors, and a motor control program can be added on the basis of the control program of the excitation control power source, to realize subdivision of step angle, reducing impact and jitter for higher rotation stability and control precision, and this is similar to the case that an engine with more cylinders can run more stable than a one with less cylinders. In addition, this invention can increase the output power of motor by using the control program of power source bi-phase complementary conduction. Furthermore, this invention provides the method that the excitation control power source supplies forward current to the exciting coils of two phases of electric excitation permanent magnet switch components respectively on the stator and rotor in time sequence, this electric excitation conducting method can on one hand further suppress the pulsation of motor output torque, realize more stable transition of output torque and increase the output torque at the same time, on the other hand, the subdivision of conducting angles can further reduce the step angles of stator and rotor, or reducing the angles of the step motor, thus laying the foundation for precision control of motors.

4. The electric excitation permanent magnet switch components on the stator and rotor are magnetically isolated, avoiding the magnetic interference and flux leakage between the phases, and this enables adopting the bi-phase complementary conduction control mode, to greatly improve the output power and stability of the motor.

5. The motor in this invention is in an installation structure of modular building blocks, each electric excitation permanent magnet switch component is an independent structural piece for assembling as a building block, therefore it can ensure good process arrangement in production with high consistency, strong batch production capacity, light weight and reduced materials, as all components and parts are in building block design, streamline production is possible at low cost, with easier quality control and high efficiency and quality.

6. In the motor of this invention, the mixed excitation of the permanent magnet magnetic potential and the electric energy of the exciting current produce a superimposed magnetic torque to push the rotor to rotate, therefore it can save energy, is environmental-friendly, low carbon, high in efficiency and low in motor heat generation, and the torque can be substantially increased.

7. The basic component of the motor in this invention— the electric excitation permanent magnet switch component is normally in a magnetic short-circuited state, there is no magnetic line of force passing through the air gap between the magnetic salient poles of the stator and rotor, in assembling, there is no attracting force from the permanent magnet field because of "self short-circuit of modules", and high precision and precise air gap can be achieved, to ensure high efficiency, and it is also quite convenient for maintenance.

8. For the motor in this invention, the number of electric excitation permanent magnet switch components in the stator and rotor can be determined conveniently according to actual needs, the angular difference between the steps can be set conveniently according to a given angular action cycle, to have a motor with rotor rotating at a given regularity following the given current input sequence, therefore it has very high controllability, speed adjustability and high performance to price ratio. It has also provided a totally new high efficient and flexible type of motor to the control motor series.

9. In this invention, building block components are used and they are magnetically isolated from each other, therefore materials with low specific weight such as aluminum alloy or plastic alloy can be used for the connecting bases of components, this can greatly reduce the production cost and dead weight of the motor, and also reduce the dead weight of rotor for lower inertia of the rotor, to improve control precision and reduce loss.

In the attached figures above, 11 is the exciting coil, 12 is the soft magnet, 13 is the permanent magnet, 14 is the soft magnet salient pole, 15 is the soft magnet salient pole, 16 is the iron core, 21 is the permanent magnet, 22 is the soft magnet, 23 is the soft magnet salient pole, 24 is the iron core, 25 is the exciting coil, 26 is the soft magnet salient pole, 31 is the soft magnet, 32 is the exciting coil, 33 is the iron core, 34 is the permanent magnet, 35 is the soft magnet salient pole, 36 is the soft magnet influenced by the magnetic poles of the soft magnet and able to link the magnetic path between the soft magnet magnetic salient poles, 37 is the soft magnet salient pole, 41 is the soft magnet, 42 is the permanent magnet, 43 is the iron core, 44 is the soft magnet salient pole, 45 is the soft magnet salient pole, 46 is the exciting coil, 47 is the permanent magnet, 51 is the soft magnet salient pole, 52 is the exciting coil, 53 is the iron core, 54 is the soft magnet salient pole, 55 is the permanent magnet, 56 is the soft magnet, 57 is the permanent magnet, 101 is the exciting coil, 102 is the soft magnet salient pole, 103 is the soft magnet salient pole, 104 is the iron core, 105 is the strip-shaped iron core salient pole, 106 is the permanent magnet, 107 is the strip-shaped iron core salient pole, 108 is the rotor shaft seat, 109 is the rotating shaft, 111 is the soft magnet, 112 is the exciting coil and iron core, 113 is the salient pole of the strip-shaped iron core, 114 is the magnetic salient pole of the soft magnet, 115 is the strip-shaped iron core, 116 is the rotor shaft seat, 117 is the permanent magnet, 201 is the magnetic salient pole of the stator switch component of individual motor 1 A (1), 202 is the magnetic salient pole of the stator switch component of individual motor 2 A (2), 203 is the magnetic salient pole of the stator switch component of individual motor 3 A (3), 211 is the magnetic salient pole of the rotor switch component of individual motor 1 I (1), 212 is the magnetic salient pole of the rotor switch component of individual motor 2 I (2), 213 is the magnetic salient pole of the rotor switch component of individual motor 3 I (3), 301 is the stator switch component exciting coil, 302 is the stator switch component soft magnet, 303 is the stator switch component permanent magnet, 304 is the rotating shaft, 305 is the stator switch component magnetic salient pole, 306 is the rotor switch component magnetic salient pole, 311 is the stator switch component magnetic salient pole, 312 is the stator switch component iron core, 313 is the stator switch component permanent magnet, 314 is the rotor switch component magnetic salient pole, 315 is the rotating shaft, 316 is the rotor switch component permanent magnet, 317 is the rotor switch component iron core, 318 is the rotor switch component exciting coil, and 319 is the stator switch component exciting coil.

MODE OF CARRYING OUT THE INVENTION

Figure 1:
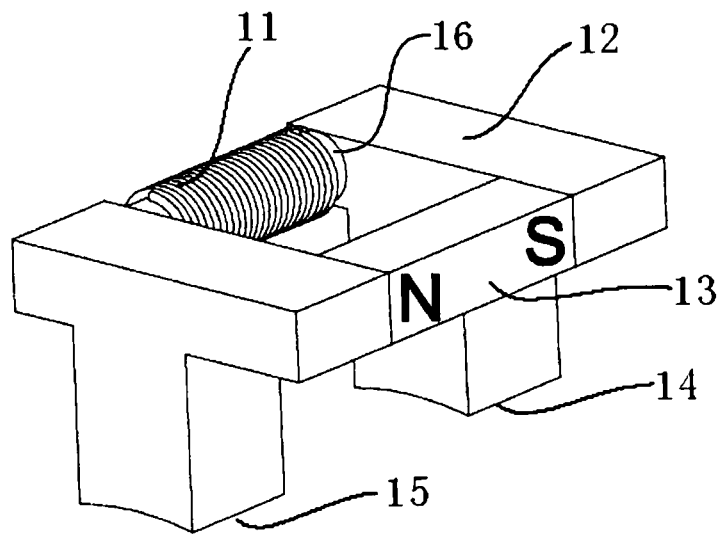
FIG. 1 is the schematic diagram of the structure of I of the electric excitation permanent magnet switch
Figure 2:
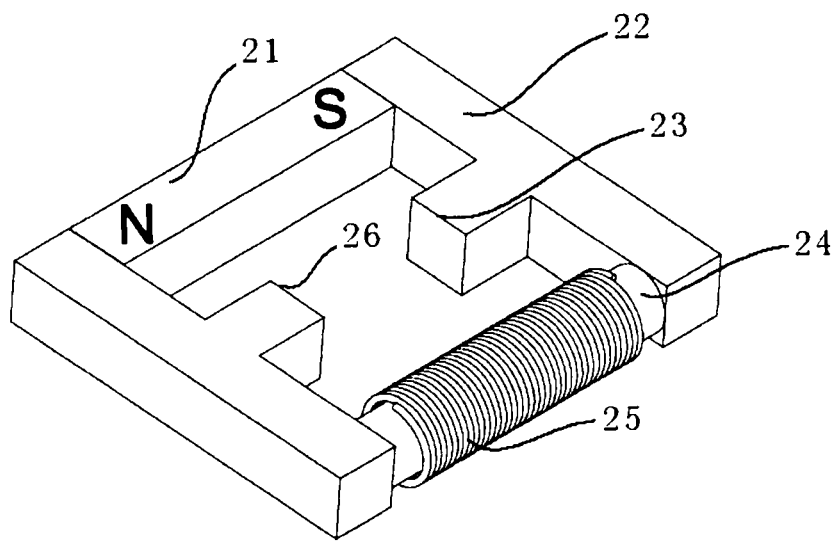
FIG. 2 is the schematic diagram of the structure of II of the electric excitation permanent magnet switch
Figure 3:
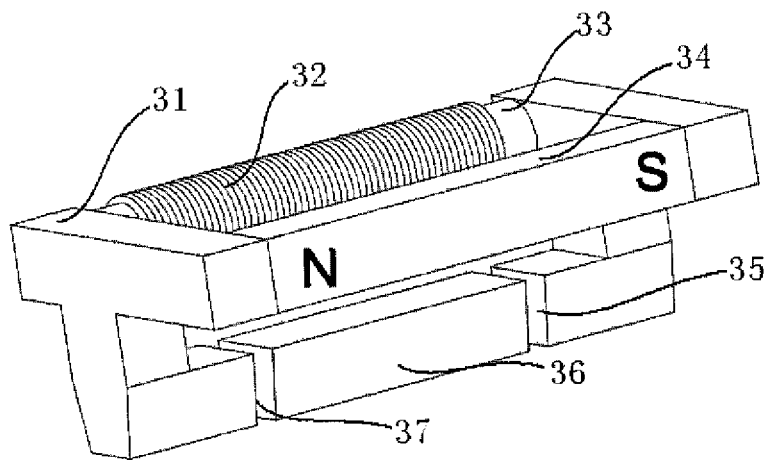
FIG. 3 is the schematic diagram of the structure of III of the electric excitation permanent magnet switch
Figure 4:
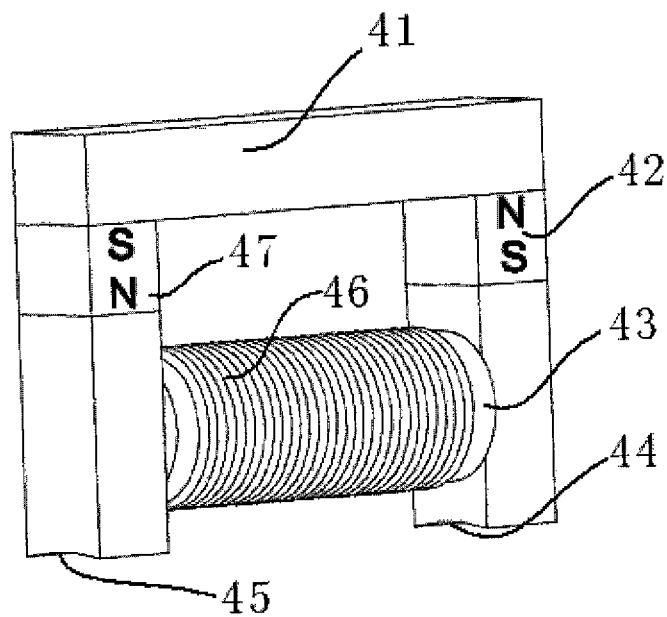
FIG. 4 is the schematic diagram of the structure of IV of the electric excitation permanent magnet switch
Figure 5:
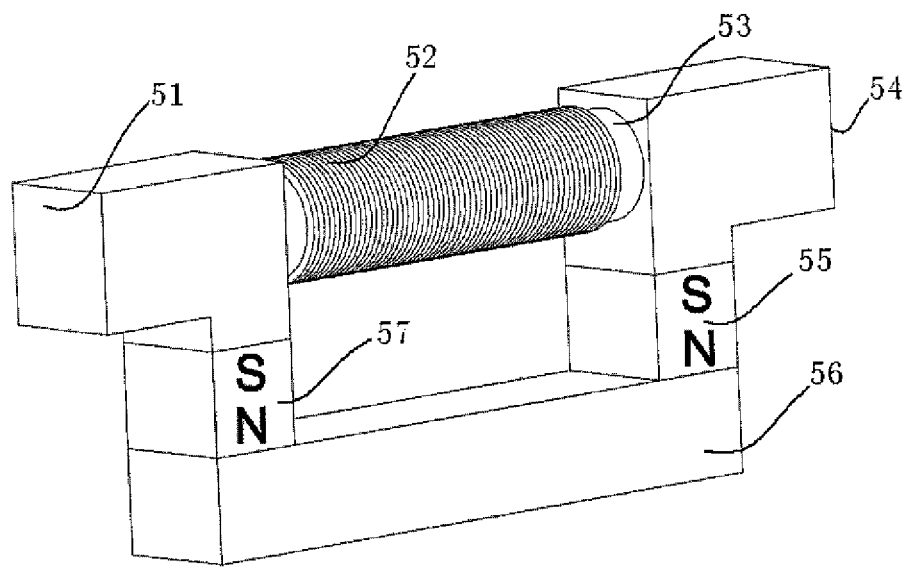
FIG. 5 is the schematic diagram of the structure of V of the electric excitation permanent magnet switch
Figure 6:
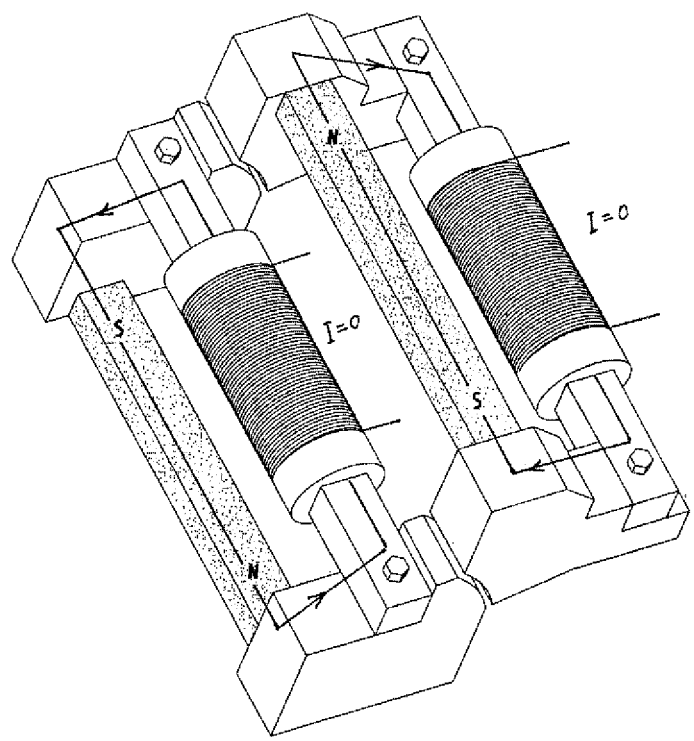
FIG. 6 is the schematic diagram of the mutual relations and magnetic circuit of the rotor electric excitation permanent magnet switch component and stator electric excitation permanent magnet switch component when the exciting current is zero.
Figure 7:
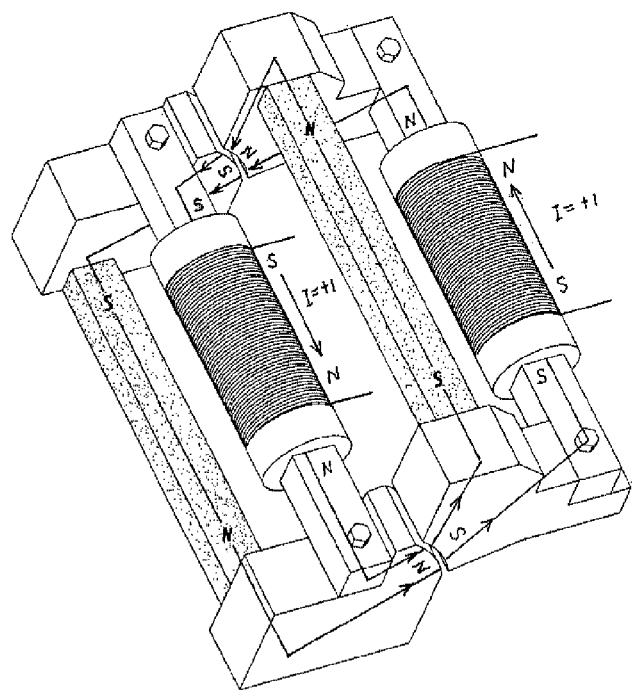
FIG. 7 is the schematic diagram of the mutual relations and magnetic circuit of the rotor electric excitation permanent magnet switch component and stator electric excitation permanent magnet switch component when a forward exciting current is admitted.
Figure 8:
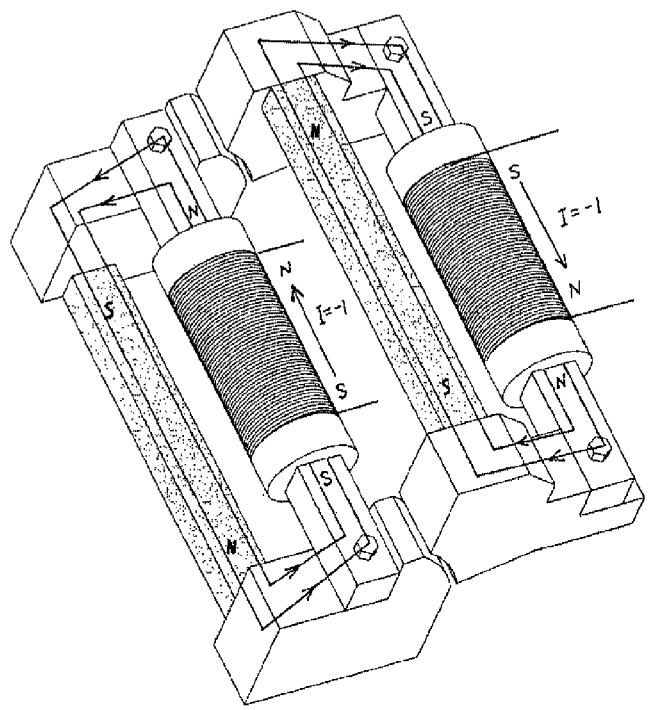
FIG. 8 is the schematic diagram of the mutual relations and magnetic circuit of the rotor electric excitation permanent magnet switch component and stator electric excitation permanent magnet switch component when a reverse exciting current is admitted.
Figure 9:
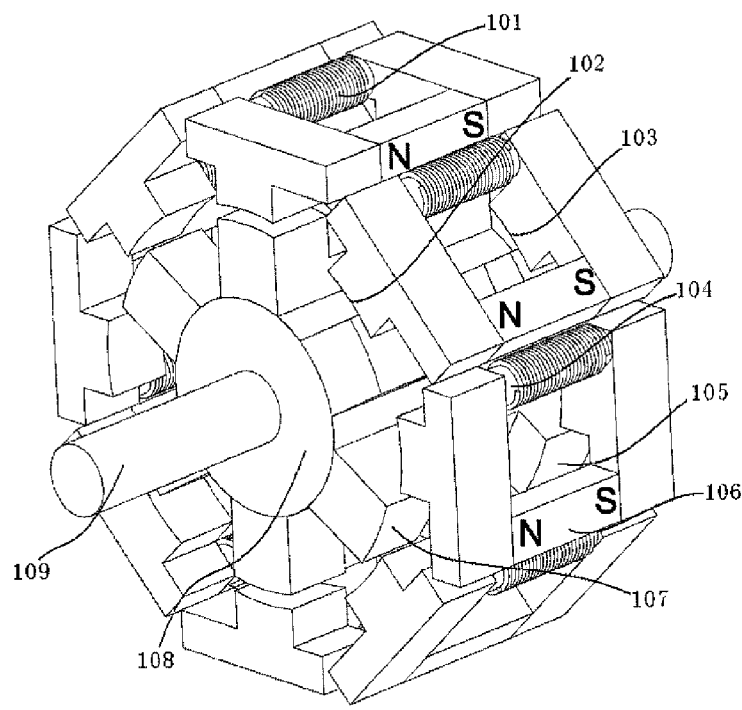
FIG. 9 is the schematic diagram of the main structure of Embodiment I of this invention. (The stator has 8 electric excitation permanent magnet switch components with a total of 16 magnetic salient poles, and the rotor has 6 strip-shaped iron cores with a total of 12 salient poles)
Figure 10:
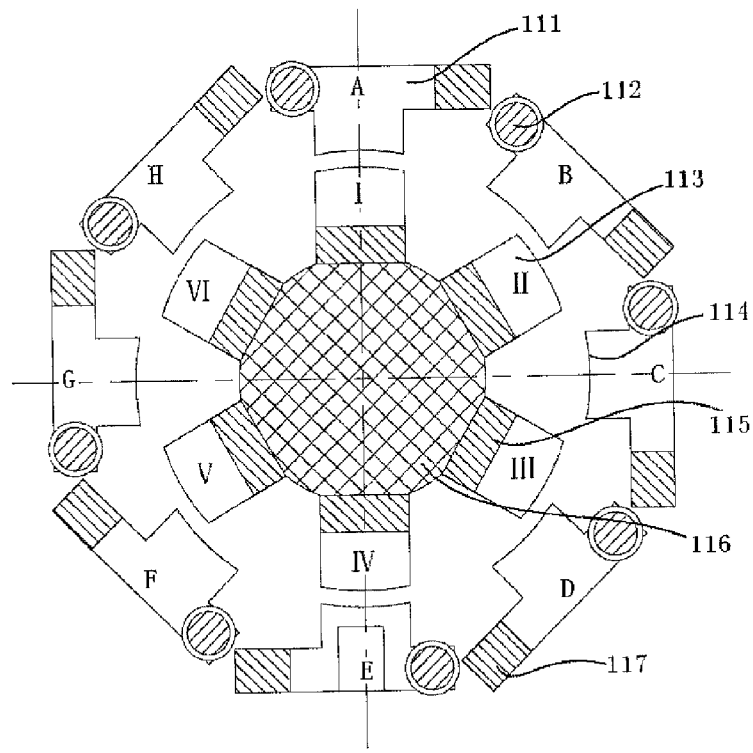
FIG. 10 is the sectional view of Embodiment I of this invention.
Figure 11:
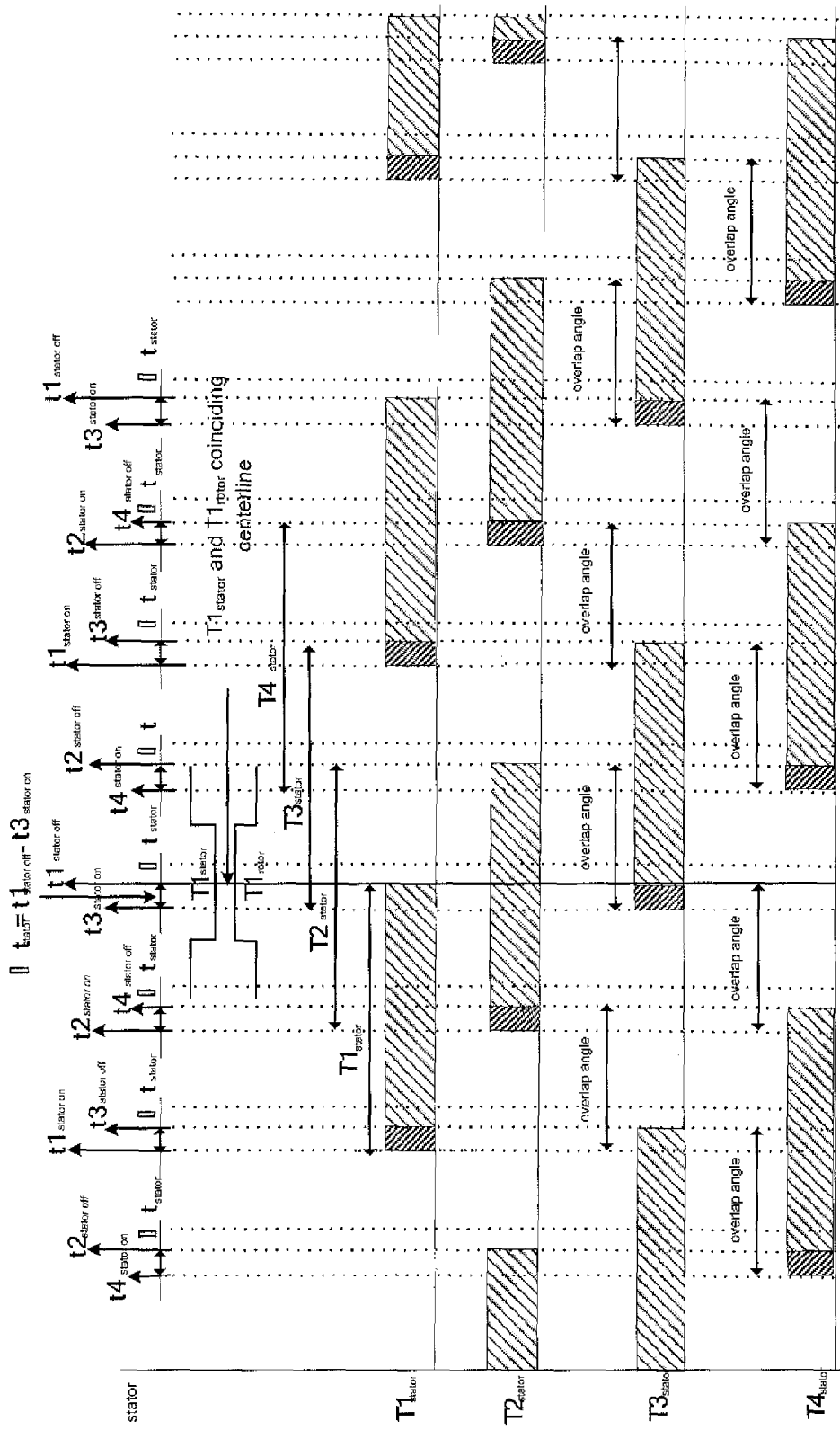
FIG. 11 is the energizing time sequence in case of two-phase line electric excitation for stator in Embodiments 1 of this invention.

Embodiment 1:

The structure of this embodiment is as shown in attached FIG. 9, the sectional view of the structure of this embodiment is as shown in attached FIG. 10.

In this embodiment the stator has 8 electric excitation permanent magnet switch components, these 8 electric excitation permanent magnet switch components are fixed symmetrically at equal spacing on the motor housing inner wall, in the electric excitation permanent magnet switch component the protruding direction of soft magnet salient pole 102 and soft magnet salient pole 103 is vertical to the plane of iron core 104 and permanent magnet 106, pointing to the motor rotating shaft 109. The rotor shaft seat 108 and rotating shaft 109 are fixed, the 6 strip-shaped iron cores, with the rotating shaft 109 as the symmetric axis, are fixed symmetrically at equal spacing on the rotor shaft seat 108, each strip-shaped iron core has two salient poles, the extruding parts of the strip-shaped iron core salient pole 105 and strip-shaped iron core salient pole 107 point to the radial direction of the rotating shaft. Each stator electric excitation permanent magnet switch component has two magnetic salient poles, these two magnetic salient poles 102 and 103 are axially distributed along the rotating shaft, the 8 stator switch components have a total of 8×2 magnetic salient poles, while the 6 rotor strip-shaped iron cores have a total of 6×2 salient poles, the salient poles 107 and 105 of each rotor strip-shaped iron core are also axially distributed along the rotating shaft. There is a minimal air gap between the stator switch component magnetic salient pole and rotor strip-shaped iron core salient pole. The exciting coils of the 8 electric excitation permanent magnet switch components of the motor stator are connected in pairs in series or in parallel, forming 4 phase lines, i.e. the exciting coil of stator switch component A and that of switch component E are connected in series or in parallel, the exciting coil of stator switch component B and that of switch component F are connected in series or in parallel, the exciting coil of stator switch component C and that of switch component G are connected in series or in parallel, and the exciting coil of stator switch component D and that of switch component H are connected in series or in parallel.

In this embodiment, the excitation control power source can supply power to single phase of the stator one by one. When the excitation control power source supplies power to the exciting coil of stator switch component A-E phase line, a magnetic field is formed by the 4 magnetic salient poles of the stator switch components A and E, attracting the salient poles of the closest two rotor strip-shaped iron cores, to form the shortest magnetic line circuit, this magnetic torque makes the rotating shaft rotate by a given angle (making the centerlines of the stator and rotor magnetic salient poles coincide), when the 4 magnetic salient poles of the stator switch components A and E are just opposite to the 4 salient poles of rotor strip-shaped iron cores I and rotor strip-shaped iron core IV, the excitation control power source immediately stops the power supply to the exciting coils of stator switch component A-E phase line, the 4 magnetic salient poles of the stator switch components A and E then cancels the acting force on the 4 salient poles of rotor strip-shaped iron cores I and IV, at the same time of stopping the power supply to the exciting coil of A-E phase line, the excitation control power source supplies power to the exciting coil of stator switch component B-F phase line, the magnetic salient poles of stator switch component B-F phase line will also act on the salient poles of the closest rotor strip-shaped iron core, so that the rotating shaft is rotated again by a given angle. The excitation control power source supplies power to the exciting coils of all phases of stator switch components, to keep the rotating shaft rotating. The positions of the stator and rotor in Attached FIG. 10 indicates the moment when the stator D-H phase line is just to be energized, the A-E phase line and B-F phase line are not energized and C-G phase line is just to be deenergized.

In this embodiment, the excitation control power source can also supply power simultaneously to two phases of the stator in sequence and cyclically. Further, when the angle between the salient pole radial centerline of the rotor strip-shaped iron core and the magnetic salient pole radial centerline of the closest stator switch component in the rotating direction is less than a given circle center angle, the exciting winding of that stator phase conducts, producing an attracting force in the rotating shaft rotating direction, when the rotor rotates to the point that the salient pole radial centerline of the rotor strip-shaped iron core and the magnetic salient pole radial centerline of the stator coincide, the current in this phase of stator exciting coil is cut off, in this way, under the control by the power source control program, at least two phases of the electric excitation permanent magnet switch components on the stator can be maintained conducting at all times, so in the whole circle of rotation of the motor rotating shaft, a magnetic torque rotating in the same direction and with overlapped rotating angles between phases can be obtained, this has effectively solved the serious defects of lowered power in commutation and impact and jittering instability of rotation existing with traditional switched reluctance motors, and also increased the output power to volume ratio. Attached Fig. shows the time sequence of the excitation control power source in this Embodiment supplying power to the 8 electric excitation permanent magnet switch components on the stator in sequence.

Figure 12:
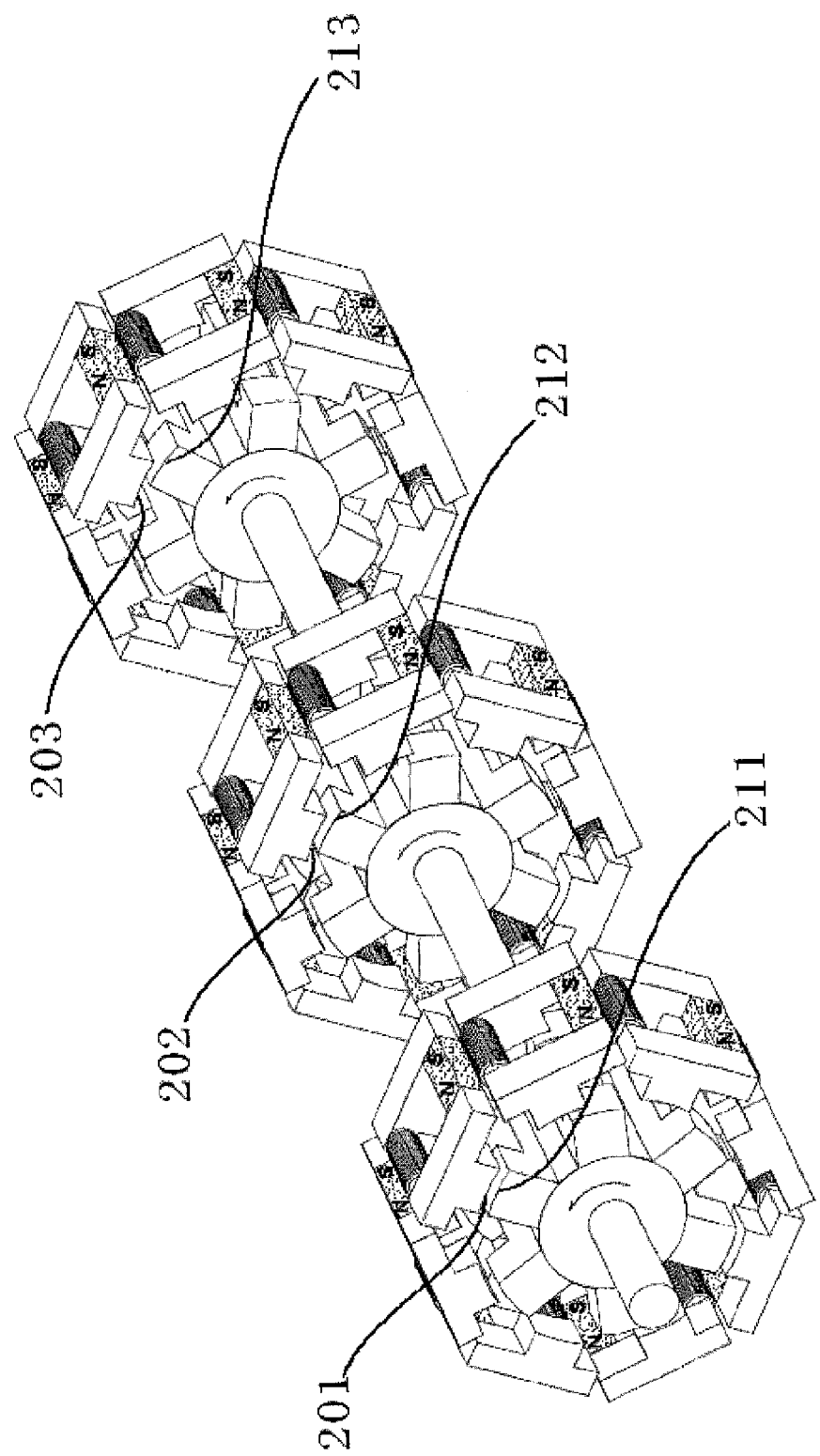
FIG. 12 is the schematic diagram of the main structure of Embodiment 2 of this invention.

Embodiment 2:

The structure of this embodiment is as shown in attached FIG. 12.

Figure 13:
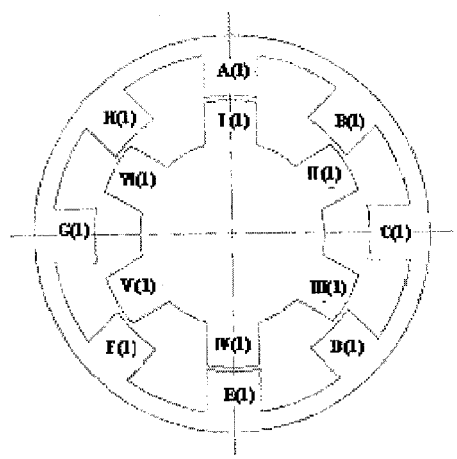
FIG. 13 is the sectional schematic diagram of the structure of the first individual motor in Embodiment 2 of this invention.
Figure 14:
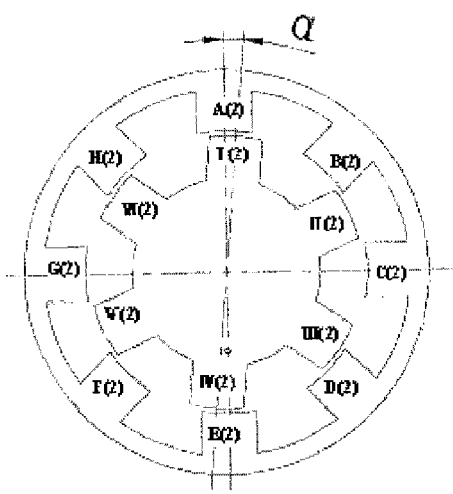
FIG. 14 is the sectional schematic diagram of the structure of the second individual motor in Embodiment 2 of this invention.
Figure 15:
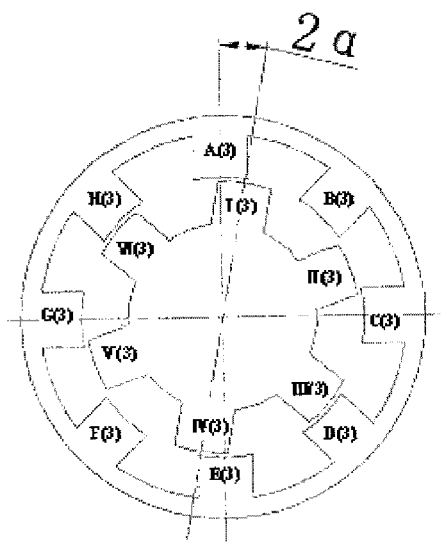
FIG. 15 is the sectional schematic diagram of the structure of the third individual motor in Embodiment 2 of this invention.

This embodiment is a further structure on the basis of the motor given in the afore-said Embodiment 1. The motor given in the afore-said Embodiment 1 is an individual motor in this embodiment. Three individual motors share one rotating shaft. As shown in attached FIG. 12, the relative positions between the stators of the three individual motors are completely identical, i.e. there is no rotating angle difference between the radial centerlines of the salient poles of the stator switch components of the three individual motors, while between the radial centerlines of the salient poles of the rotor strip-shaped iron core of the three individual motors, there is a rotating angle difference α, Attached FIG. 13 shows the sectional view of the individual motor in the front, Attached FIG. 14 shows the sectional view of the individual motor in the middle, and Attached FIG. 15 shows the sectional view of the individual motor in the rear. In the figures, the angle α is the rotating angle set between the radial centerlines of salient poles of rotor strip-shaped iron cores of different individual motors, and a is 5 degrees. The three individual motors so arranged have realized the subdivision of step angles of individual motors, and also, at any angle of rotation, power is supplied to a number of phases in a number of layers to produce a rotating torque. This enables increasing the output power, achieving the effect of stable start and running of switched reluctance motor with multiple salient pole pairs.

For the combined electric excitation permanent magnet switch reluctance motor given in this embodiment, in each individual motor, power is supplied to single phases of the stator in sequence cyclically, however, for corresponding phase lines on different individual motor stators (the corresponding phase line is the first phase (A-E)$_1$ of the front individual motor and the first phase (A-E)$_2$ of the middle individual motor and the first phase (A-E)$_3$ of the rear individual motor), there is a fixed time difference between the moments of power supply, and this time difference is associated with the rotating angle α of the rotor radial centerlines between different individual motors. The position sensors provided on the motor stators and rotors send the stator and rotor position signals to the excitation control power source, which controls the start and end moment of supplying power to the stator phase lines of the three individual motor stators, thus controlling the running status of the three individual motors.

For the combined electric excitation permanent magnet switch reluctance motor given in this embodiment, in each individual motor, power can also be supplied to two phases of respective stators in sequence cyclically, and for corresponding phase lines on different individual motor stators (the corresponding phase line is the first phase (A-E)$_1$ of the front individual motor and the first phase (A-E)$_2$ of the middle individual motor and the first phase (A-E)$_3$ of the rear individual motor), there is a fixed time difference between the moments of power supply, and this time difference is associated with the rotating angle α of the rotor radial centerlines between different individual motors. In this power supply mode, the excitation control power source always supplies power simultaneously to the respective two adjacent phases of the stator switch components of the three individual motors, while in the short time period of power supply commutation ($\Delta t_{stator}$ is not zero), the excitation control power source simultaneously supplies power to three adjacent phases of the stator switch components, the position sensors provided on the motor stator and rotor send stator and rotor position signals to the excitation control power source, which controls the start and end moments of supplying power to various phase lines of the stator and rotor of three individual motors, thus controlling the running status of the three individual motors.

Figure 16:
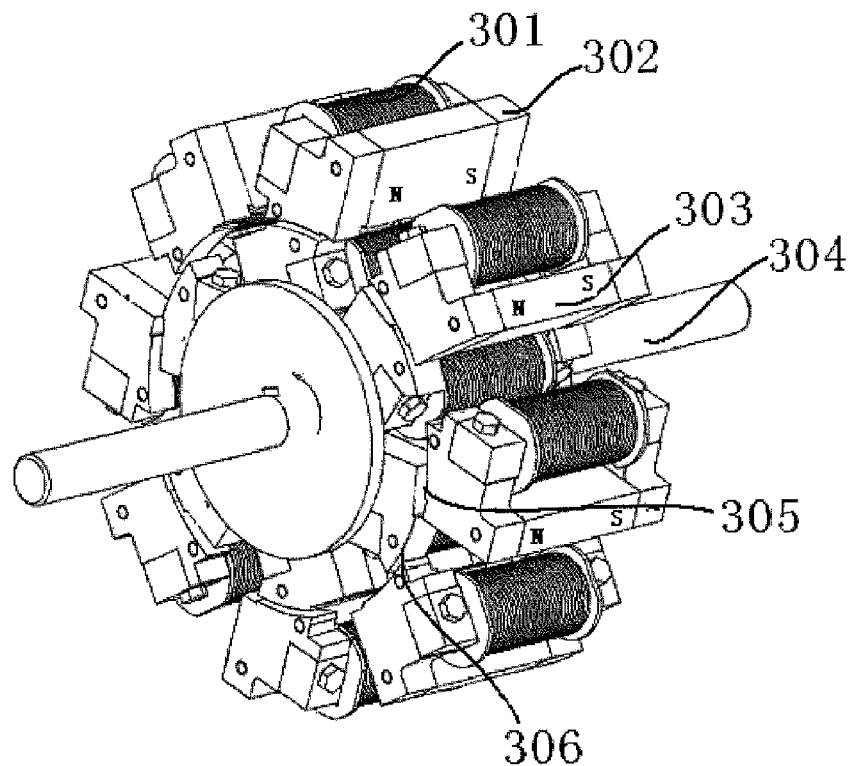
FIG. 16 is the schematic diagram of the main structure of Embodiment 3 of this invention.
Figure 17:
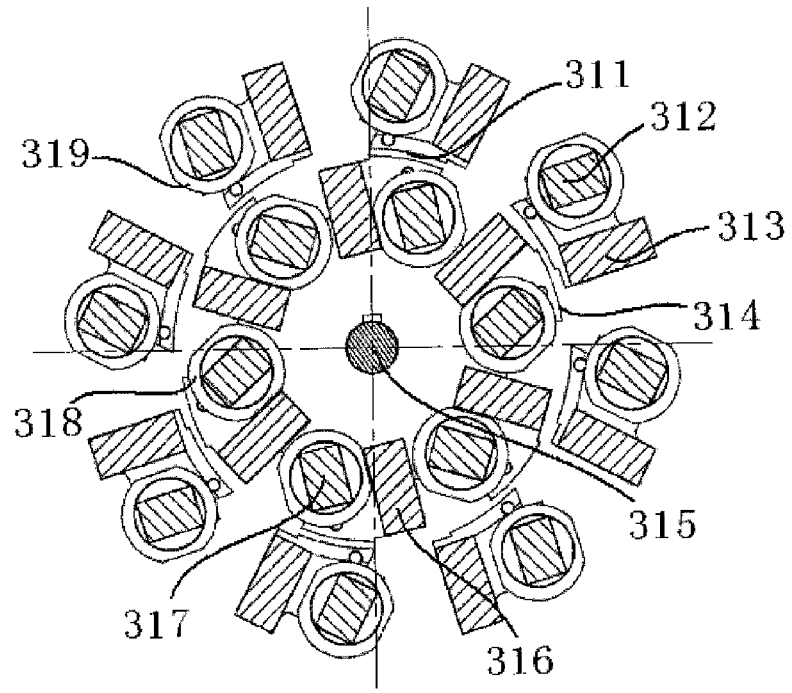
FIG. 17 is the sectional view of the main structure of Embodiment 3 of this invention.

Embodiment 3:

The structure of this embodiment is as shown in Attached FIG. 16 and Attached FIG. 17.

In this embodiment the stator is formed by 8 electric excitation permanent magnet switch components, these 8 electric excitation permanent magnet switch components are fixed symmetrically at equal spacing on the motor housing inner wall, and the 8 electric excitation permanent magnet switch components on the stator are mutually in a magnetically isolated state, in the stator electric excitation permanent magnet switch component, the protruding direction of soft magnet salient pole 305 is vertical to the plane of iron core exciting coil 301 and permanent magnet 303, pointing to the motor rotating shaft 304. Each stator electric excitation permanent magnet switch component has two magnetic salient poles, these two magnetic salient poles are axially distributed along the rotating shaft, the 8 switch components have a total of 8×2 magnetic salient poles. In this embodiment the rotor is formed by 6 electric excitation permanent magnet switch components, these 6 electric excitation permanent magnet switch components are fixed symmetrically at equal spacing around the rotor shaft seat, and the 6 electric excitation permanent magnet switch components around the rotor shaft seat are mutually in a magnetically isolated state, in the 6 rotor electric excitation permanent magnet switch components, the protruding direction of magnetic salient pole 306 points in the radial direction of the rotating shaft, the 6 rotor switch components have 6×2 magnetic salient poles, every two magnetic salient poles form a group, each group of two salient poles are axially distributed along the rotating shaft, the stator switch component magnetic salient poles and rotor switch component magnetic salient poles are arranged opposite to each other, with a minimal air gap between them. The exciting coils of the 8 electric excitation permanent magnet switch components of the motor stator are connected in pairs in series or in parallel, forming 4 phase lines, i.e. the exciting coil of stator switch component A and that of switch component E are connected in series or in parallel, the exciting coil of stator switch component B and that of switch component F are connected in series or in parallel, the exciting coil of stator switch component C and that of switch component G are connected in series or in parallel, and the exciting coil of stator switch component D and that of switch component H are connected in series or in parallel, forming 4 phase lines, i.e. stator A-E phase line, stator B-F phase line, stator C-G phase line and stator D-H phase line. The exciting coils of the 6 electric excitation permanent magnet switch components of the motor rotor are also connected in pairs in series or in parallel, i.e. the exciting coil of rotor switch component I and that of switch component IV are connected in series or in parallel, the exciting coil of rotor switch component II and that of switch component V are connected in series or in parallel, and the exciting coil of rotor switch component III and that of switch component VI are connected in series or in parallel, forming a total of 3 phase lines, i.e. rotor I-IV phase line, rotor II-V phase line and rotor III-VI phase line. The four phase lines of the stator and the three phase lines of the rotor are respectively supplied with power by the excitation control power source in specified time sequence.

Figure 18:
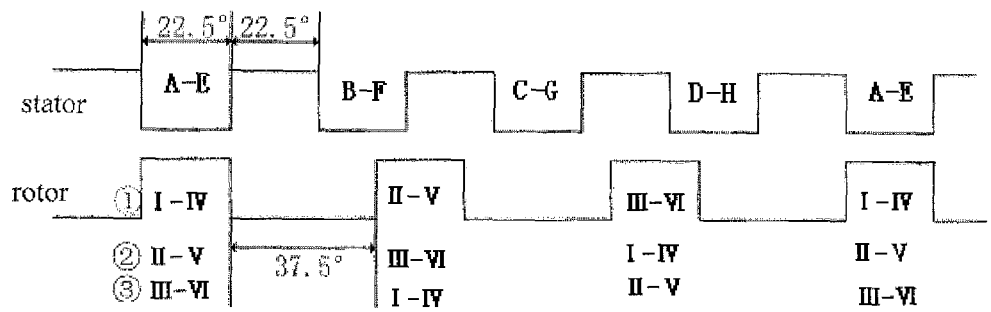
FIG. 18 shows the initial positions of stator and rotor in case of electric excitation of a single phase line for each of them in Embodiments 3 of this invention.

An electric excitation method for the stator and rotor in this embodiment is: the excitation control power source provides excitation electric energy to one phase line of the stator and one phase lines of the rotor simultaneously in sequence cyclically. The following shows the details of one phase line each for the stator and rotor is energized with power supply in this embodiment:

To facilitate the description, the state switch components and rotor switch components in annular arrangement are all unfolded in a flat plane, to obtain the schematic diagram of the initial stator and rotor positions, as shown in Attached FIG. 18. There are mainly the following three cases:

☐ Coinciding of stator A-E phase and rotor I-IV phase winding is taken as its initial position, and all other phases can be energized in turn in sequence.

☐ Coinciding of stator A-E phase and rotor II-V phase winding is taken as its initial position, and all other phases can be energized in turn in sequence.

☐ Coinciding of stator A-E phase and rotor III-VI phase winding is taken as its initial position, and all other phases can be energized in turn in sequence.

In Attached FIG. 18, for the convenience of description, coinciding of stator A-E phase and a phase of the rotor in this embodiment is taken as the initial position, of course actually there will be inks of alignment, so the simultaneous excitation of the stator phase and rotor phase can be determined according to actual conditions.

Single phase power supply and excitation can simplify the control pulses of the motor, but will increase the pulsation in its output torque. In FIG. 18, there are three cases with the initial positions of stator and rotor, here, we only choose case ☐ as an example, to describe the phase sequence flow diagram of its energizing, and the other two cases are similar. With the stator and rotor initial positions in case ☐ as the actual stator and rotor positions of the permanent magnet switched reluctance motor, the energizing phase sequence with a single phase line of the stator and rotor respectively is as shown in Attached Table I.

ATTACHED TABLE 1

| Stator energizing sequence | Rotor energizing sequence (corresponding) |
|---|---|
| (B-F) | (II-V) |
| (C-G) | (III-VI) |
| (D-H) | (I-IV) |
| (A-E) | (II-V) |
| (B-F) | (III-VI) |
| (C-G) | (I-IV) |
| (D-H) | (II-V) |
| (A-E) | (III-VI) |
| (B-F) | (I-IV) |
| (C-G) | (II-V) |
| (D-H) | (III-VI) |
| (A-E) | (I-IV) |
| (B-F) | (II-V) |

It can be seen in Table 1 that line 1 and line 13 are identical, indicating that after 12 phase sequences, the previous energizing sequence will be repeated, that is, 12 phase sequences are one cycle of its energizing, and this cycle will be repeated continually afterwards. It is identical for cases ☐ and ☐, only different at the start, for case ☐, the energizing sequence starts from line 5 of Table 1, then the energizing sequence goes on afterward, also with 12 phase sequences as one cycle; for case ☐, the energizing sequence starts from line 9 of Table 1, then the energizing sequence goes on afterward, also with 12 phase sequences as one cycle.

Figure 19:
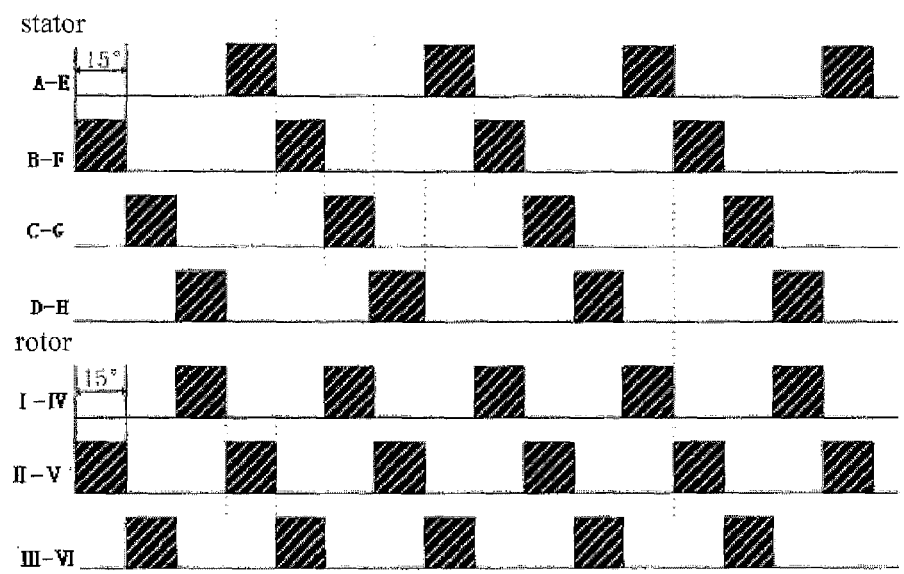
FIG. 19 is the energizing time sequence diagram of stator and rotor in case of electric excitation of a single phase line for each of them in Embodiments 3 of this invention.

For case ☐ as shown in Attached FIG. 18, the single phase energizing time sequence diagram for the stator and rotor is obtained with their actual initial positions, as shown in Attached FIG. 19. It can be seen from Attached FIG. 19 that, when a single phase of the permanent magnet switched reluctance motor is energized, the conducting angle of each phase is 15°, after a phase is energized for 15°, the stator and rotor coincide with each other, starting at this moment, the stator and rotor are both commutated to the next phase, so as to ensure that at any moment, only one corresponding phase on the stator and rotor is energized. It can also be seen from Attached FIG. 19 that, each stator phase is cut off for 45° after being energized for 15°, before it is energized again; for the rotor which is structured with three phase lines, each rotor phase is cut off for 30° after being energized for 15°, before it is energized again, and this process goes on in that sequence. Therefore, single phase energizing requires simpler control as compared with multi-phase energizing, also; thanks to the electric excitation permanent magnet switch components on the rotor, the output torque can be significantly increased.

Figure 20:
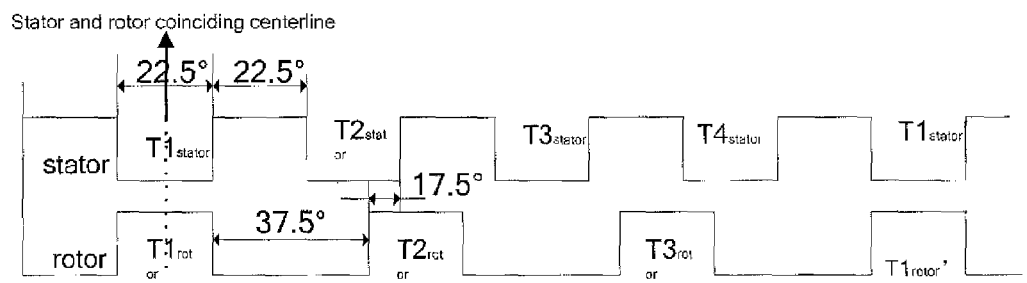
FIG. 20 shows the initial positions of stator and rotor in case of electric excitation of two phase lines for each of them in Embodiments 3 of this invention.

Another electric excitation method for the stator and rotor in this embodiment is: the excitation control power source maintains at all times the power supply to at least two phases of the stator switch component, meanwhile, the excitation control power source also maintains at all times the power supply to at least one phase of the rotor switch component. This electric excitation method can, on one hand, increase the output torque of the motor, and on the other hand, compensate for the torque fluctuation, so that the torque fluctuation is much smaller than that in the case of single-phase excitation. The following shows the details of the stator and rotor phase lines being energized with power in this embodiment:

To facilitate the description, the state switch components and rotor switch components in annular arrangement are all unfolded in a flat plane, to obtain the schematic diagram of the initial stator and rotor positions, as shown in Attached FIG. 20. The main case is: coinciding of stator $T1_{stator}$ phase and rotor $T1_{rotor}$ phase windings is taken as its initial position, and all other phases can be energized in turn in sequence.

In Attached FIG. 20, for the convenience of description, coinciding of stator $T1_{stator}$ phase and a phase of the rotor is taken as the initial position, of course actually there will be miss of alignment, so it can be determined according to actual conditions.

The stator and rotor initial position in FIG. 20 is taken as the actual stator and rotor position of the permanent magnet switched reluctance motor, and the phase sequence flow diagram of energizing of two phases is as shown in Attached Table 2.

ATTACHED TABLE 2

| Stator energizing sequence | Rotor energizing sequence (corresponding) |
|---|---|
| B-F, C-G | II-V, III-VI |
| C-G, D-H | III-VI, I-IV |
| D-H, A-E | I-IV, II-V |
| A-E, B-F | II-V, III-VI |
| B-F, C-G | III-VI, I-IV |
| C-G, D-H | I-IV, II-V |
| D-H, A-E | II-V, III-VI |
| A-E, B-F | III-VI, I-IV |
| B-F, C-G | I-IV, II-V |
| C-G, D-H | II-V, III-VI |
| D-H, A-E | III-VI, I-IV |
| A-E, B-F | I-IV, II-V |
| B-F, C-G | II-V, III-VI |

It can be seen in Table 2 that line 1 and line 13 are identical, indicating that after 12 phase sequences, the previous energizing sequence will be repeated, that is, 12 phase sequences are one cycle of its energizing, and this cycle will be repeated continually afterwards.

Figure 21:
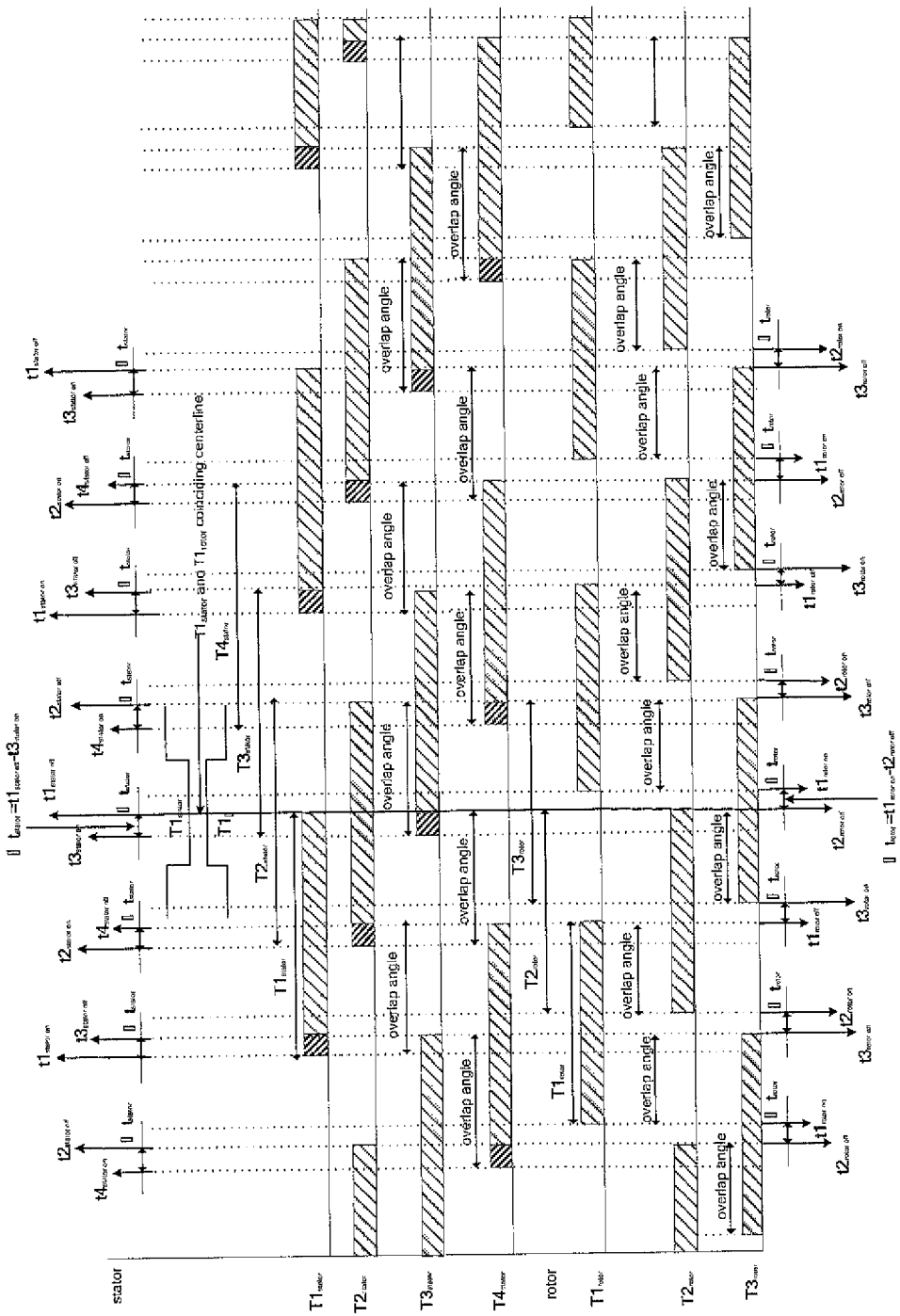
FIG. 21 is the energizing time sequence diagram of stator and rotor in case of electric excitation of two phase lines for each of them in Embodiments 3 of this invention.

With the case as shown in Attached FIG. 20 as the actual initial positions of its stator and rotor, the bi-phase energizing time sequence diagram can be obtained according to the actual dimensions of the stator and rotor, as shown in Attached FIG. 21. For stator commutation, the next phase is energized in advance, to ensure that the output torque is not reduced but increased instead at the moment of commutation, avoiding the "dead point" of output torque at commutation with the traditional motors; and the rotor is energized, there is a given lagging angle, to minimize the reverse torque. The leading energizing of stators and lagged energizing of rotors is described with FIG. 20 and the time sequence diagram 1 when stator $T2_{stator}$ and $T2_{rotor}$ are energized, according to the time sequence table, stator $T3_{stator}$ and rotor $T3_{rotor}$ should also be energized at that moment, it can also be seen in FIG. 20 that, at this moment, $T3_{rotor}$ and $T4_{stator}$ partly coincide, which will produce a torque in the reverse direction, therefore, energizing $T3_{rotor}$ at a given angle is to minimize the reverse torque and not to affect its output power; meanwhile, energizing stator $T3_{stator}$ before deenergizing $T1_{stator}$ can, on one hand avoid loss of power at time of commutation and reduce the torque fluctuation and noise, and on the other hand increase the forward torque of rotor $T3_{rotor}$, thereby increasing the output power.

It can be seen in FIG. 21 that, when two phases of the permanent magnet switched reluctance motor are energized, the energizing time of each phase of it increases obviously, therefore the output torque is also increased, and the complementary energizing of two phases can ensure stable transition of the forward torque, with high effect in suppressing torque fluctuation and noise. FIG. 21 shows that, in the case of leading energizing of stator, with each phase being cut off for 30° after being energized for 30°, and then being energized again, the torque has been obviously increased as compared with the case of single phase energizing for 15°; for the rotor in a three-phase structure, the arrangement of energizing for less than 30°, cutting off for more than 15° and energizing again in cycle has increased the energizing time and shortened the off time, improving the output torque and efficiency of the motor. Therefore, although bi-phase energizing requires much more complicated control as compared with single-phase energizing, in general, its performance is better than that of single-phase energizing, and it can also well suppress the torque pulsation.

Attached FIG. 20 shows the stator and rotor initial positions in this embodiment, i.e. coinciding of stator $T1_{stator}$ phase and rotor $T1_{rotor}$ phase winding is taken as their initial positions. As it is bi-phase energizing, after that, according to the time sequence table, it should be: stators $T2_{stator}$, $T3_{stator}$ and rotors $T2_{rotor}$, $T3_{rotor}$ energizing. Stator $T3_{stator}$ is energized at a given angle before the coinciding of stator $T1_{stator}$ phase and rotor $T1_{rotor}$ phase winding, that is, stator $T3_{stator}$ is energized in advance; when stator $T1_{stator}$ phase and rotor $T1_{rotor}$ phase winding coincide, stator $T1_{stator}$ phase and rotor $T1_{rotor}$ phase winding are cut off simultaneously; after stator $T1_{stator}$ phase and rotor $T1_{rotor}$ phase winding have passed the coinciding line by a given angle, rotor $T3_{rotor}$ is energized, that is, rotor $T3_{rotor}$ is energized with a lag, and after that, it goes on in such a cycle. The bi-phase simultaneous excitation can, on one hand, increase the output torque of the motor, and on the other hand, compensate for the torque fluctuation, so that the torque fluctuation is much smaller than that in the case of single-phase excitation.

Figure 22:
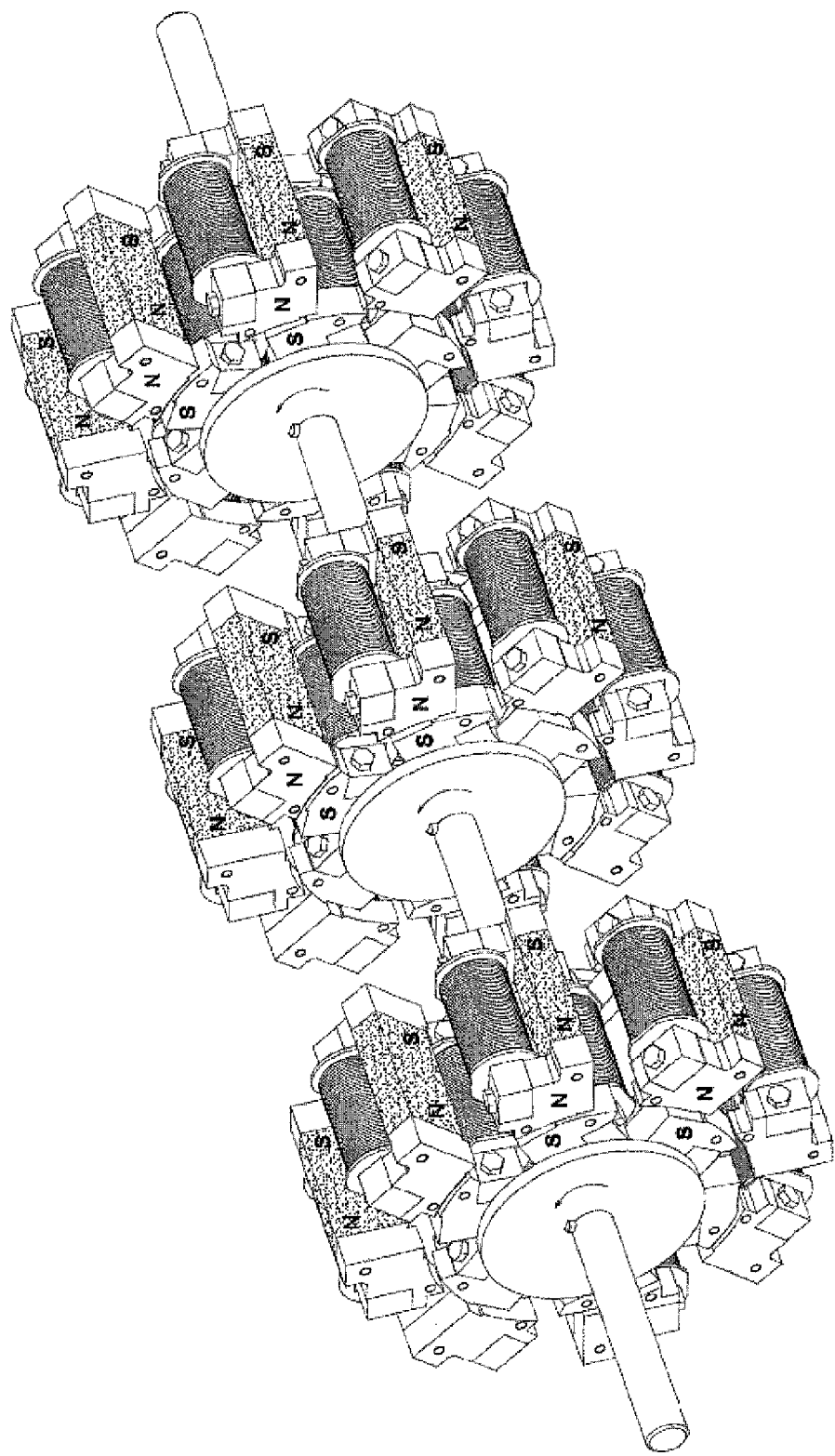
FIG. 22 is the schematic diagram of the main structure of Embodiment 4 of this invention.

Embodiment 4:

The structure of this embodiment is as shown in attached FIG. 22.

This embodiment is constructed on the basis of the afore-said Embodiment 3. The afore-said Embodiment 3 is an individual motor in this embodiment. Three individual motors share one rotating shaft. The magnetic salient pole radial centerlines of the switch components on the stators of the three individual motors coincide completely, with no radial angular difference, while the magnetic salient pole radial centerlines of the switch components on the rotors of the three individual motors are provided with an angular difference α of 5° mutually between them (refer to Attached FIG. 13, Attached FIG. 14, and Attached FIG. 15). In this embodiment, the three individual motors are arranged on the same rotating shaft to form a combined switched reluctance motor in three layers of front, middle and rear, in this structure, the method of setting axial angular difference is used to replace the method for traditional switched reluctance motors of increasing the number of magnetic pole pairs radially to realize limited subdivision of step angle, so that the combined switched reluctance motor can on one hand suppress the pulsation of motor output torque and realize more stable transition of output torque, and on the other hand, the subdivision of energizing angles can further reduce the step angles of stator and rotor, or reducing the angles of the step motor, thus laying the foundation for precision control of motors.

For the combined electric excitation permanent magnet switched reluctance motor given in this embodiment, an electric excitation method of the excitation control power source is: each individual motor supplies power to a single phase of the stator and a single phase of the rotor in sequence and cyclically, but there is a fixed time difference between the power supply moment for the corresponding phase lines (i.e. phase 1 $(A-E)_1$ of the front individual motor and phase 1 $(A-E)_2$ of the middle individual motor and phase 1 $(A-E)_3$ of the rear individual motor are the corresponding phase lines) on the stators of different individual motors, and there is a fixed time difference between the power supply moment for the corresponding phase lines (i.e. phase 1 $(I\ IV)_1$ of the front individual motor and phase 1 $(I\ IV)_2$ of the middle individual motor and phase 1 $(I\ IV)_3$ of the rear individual motor are the corresponding phase lines) on the rotors of different individual motors, the power supply time difference of corresponding phase lines of stators and rotors of different individual motors is associated with the rotating angle α between the rotor radial centerlines of different individual motors. The position sensors provided on the motor stators and rotors send the stator and rotor position signals to the excitation control power source, which controls the start and end moment of supplying power to the stator phase lines of the three individual motor stators, thus controlling the running status of the three individual motors. The energizing phase sequence of a single phase line each of the stator and rotor in all individual motors is as shown in Attached Table 3.

ATTACHED TABLE 3

| Stator energizing sequence | Rotor energizing sequence (corresponding) |
|---|---|
| $(A-E)_1$ | $(I-IV)_1$ |
| $(A-E)_2$ | $(I-IV)_2$ |
| $(A-E)_3$ | $(I-IV)_3$ |
| $(B-F)_1$ | $(II-V)_1$ |
| $(B-F)_2$ | $(II-V)_2$ |
| $(B-F)_3$ | $(II-V)_3$ |
| $(C-G)_1$ | $(III-VI)_1$ |
| $(C-G)_2$ | $(III-VI)_2$ |
| $(C-G)_3$ | $(III-VI)_3$ |
| $(D-H)_1$ | $(I-IV)_1$ |
| $(D-H)_2$ | $(I-IV)_2$ |
| $(D-H)_3$ | $(I-IV)_3$ |
| $(A-E)_1$ | $(II-V)_1$ |
| $(A-E)_2$ | $(II-V)_2$ |
| $(A-E)_3$ | $(II-V)_3$ |
| $(B-F)_1$ | $(III-VI)_1$ |
| $(B-F)_2$ | $(III-VI)_2$ |
| $(B-F)_3$ | $(III-VI)_3$ |
| $(C-G)_1$ | $(I-IV)_1$ |
| $(C-G)_2$ | $(I-IV)_2$ |
| $(C-G)_3$ | $(I-IV)_3$ |
| $(D-H)_1$ | $(II-V)_1$ |

ATTACHED TABLE 3-continued

| Stator energizing sequence | Rotor energizing sequence (corresponding) |
|---|---|
| (D-H)$_2$ | (II-V)$_2$ |
| (D-H)$_3$ | (II-V)$_3$ |
| (A-E)$_1$ | (III-VI)$_1$ |
| (A-E)$_2$ | (III-VI)$_2$ |
| (A-E)$_3$ | (III-VI)$_3$ |
| (B-F)$_1$ | (I-IV)$_1$ |
| (B-F)$_2$ | (I-IV)$_2$ |
| (B-F)$_3$ | (I-IV)$_3$ |
| (C-G)$_1$ | (II-V)$_1$ |
| (C-G)$_2$ | (II-V)$_2$ |
| (C-G)$_3$ | (II-V)$_3$ |
| (D-H)$_1$ | (III-VI)$_1$ |
| (D-H)$_2$ | (III-VI)$_2$ |
| (D-H)$_3$ | (III-VI)$_3$ |
| (A-E)$_1$ | (I-IV)$_1$ |

It can be seen in Table 3 that line 1 and line 37 are identical, indicating that after 36 phase sequences of the three individual motors, the previous energizing sequence will be repeated, that is, 36 phase sequences are one cycle of its energizing, and this cycle will be repeated continually afterwards.

For the combined electric excitation permanent magnet switch reluctance motor given in this embodiment, another electric excitation method of the excitation control power source is: in each individual motor, power can also be supplied to two phases of respective stators in sequence cyclically, and for corresponding phase lines on different individual motor stators (the corresponding phase line is the first phase (A-E)$_1$ of the front individual motor and the first phase (A-E)$_2$ of the middle individual motor and the first phase (A-E)$_3$ of the rear individual motor), there is a fixed time difference between the moments of power supply, and this time difference is associated with the rotating angle α of the rotor radial centerlines between different individual motors. In this power supply mode, the excitation control power source always supplies power simultaneously to the respective two adjacent phases of the stator switch components of the three individual motors and the respective two adjacent phases of the rotor switch components of the three individual motors, while in the short time period of power supply commutation of the power source to the stator switch components of the three individual motors (Δt$_{stator}$ is not zero), the excitation control power source simultaneously supplies power to three adjacent phases of the stator switch components of the three individual motors, during the power supply commutation of the power source to the rotor switch components of the three individual motors, i.e. Δt$_{rotor}$ is not zero, the excitation control power source supplies power to one phase of the respective rotor switch components of the three individual motors, and in all other time periods, the excitation control power source simultaneously supplies power to two phases of the respective rotor switch components of the three individual motors. The position sensors provided on the motor stators and rotors send the stator and rotor position signals to the excitation control power source, which controls the start and end moment of supplying power to the phase lines of the stators and rotors of the three individual motor stators, thus controlling the running status of the three individual motors. The energizing phase sequence of two phase lines each of the stator and rotor in all individual motors in this embodiment is as shown in Attached Table 4.

ATTACHED TABLE 4

| Stator energizing sequence | | | Rotor energizing sequence (corresponding) | | |
|---|---|---|---|---|---|
| First individual motor | Second individual motor | Third individual motor | First individual motor | Second individual motor | Third individual motor |
| (A-E)$_1$, (B-F)$_1$ | | | (I-IV)$_1$, (II-V)$_1$ | | |
| (B-F)$_1$, (C-G)$_1$ | (A-E)$_2$, (B-F)$_2$ | | (II-V)$_1$, (III-VI)$_1$ | (I-IV)$_2$, (II-V)$_2$ | |
| (B-F)$_1$, (C-G)$_1$ | (B-F)$_2$, (C-G)$_2$ | (A-E)$_3$, (B-F)$_3$ | (II-V)$_1$, (III-VI)$_1$ | (II-V)$_2$, (III-VI)$_2$ | (I-IV)$_3$, (II-V)$_3$ |
| (B-F)$_1$, (C-G)$_1$ | (B-F)$_2$, (C-G)$_2$ | (B-F)$_3$, (C-G)$_3$ | (II-V)$_1$, (III-VI)$_1$ | (II-V)$_2$, (III-VI)$_2$ | (II-V)$_3$, (III-VI)$_3$ |
| (C-G)$_1$, (D-H)$_1$ | (B-F)$_2$, (C-G)$_2$ | (B-F)$_3$, (C-G)$_3$ | (III-VI)$_1$, (I-IV)$_1$ | (II-V)$_2$, (III-VI)$_2$ | (II-V)$_3$, (III-VI)$_3$ |
| (C-G)$_1$, (D-H)$_1$ | (C-G)$_2$, (D-H)$_2$ | (B-F)$_3$, (C-G)$_3$ | (III-VI)$_1$, (I-IV)$_1$ | (III-VI)$_2$, (I-IV)$_2$ | (II-V)$_3$, (III-VI)$_3$ |
| (C-G)$_1$, (D-H)$_1$ | (C-G)$_2$, (D-H)$_2$ | (C-G)$_3$, (D-H)$_3$ | (III-VI)$_1$, (I-IV)$_1$ | (III-VI)$_2$, (I-IV)$_2$ | (III-VI)$_3$, (I-IV)$_3$ |
| (D-H)$_1$, (A-E)$_1$ | (C-G)$_2$, (D-H)$_2$ | (C-G)$_3$, (D-H)$_3$ | (I-IV)$_1$, (II-V)$_1$ | (III-VI)$_2$, (I-IV)$_2$ | (III-VI)$_3$, (I-IV)$_3$ |
| (D-H)$_1$, (A-E)$_1$ | (D-H)$_2$, (A-E)$_2$ | (C-G)$_3$, (D-H)$_3$ | (I-IV)$_1$, (II-V)$_1$ | (I-IV)$_2$, (II-V)$_2$ | (III-VI)$_3$, (I-IV)$_3$ |
| (D-H)$_1$, (A-E)$_1$ | (D-H)$_2$, (A-E)$_2$ | (D-H)$_3$, (A-E)$_3$ | (I-IV)$_1$, (II-V)$_1$ | (I-IV)$_2$, (II-V)$_2$ | (I-IV)$_3$, (II-V)$_3$ |
| (A-E)$_1$, (B-F)$_1$ | (D-H)$_2$, (A-E)$_2$ | (D-H)$_3$, (A-E)$_3$ | (II-V)$_1$, (III-VI)$_1$ | (I-IV)$_2$, (II-V)$_2$ | (I-IV)$_3$, (II-V)$_3$ |
| (A-E)$_1$, (B-F)$_1$ | (A-E)$_2$, (B-F)$_2$ | (D-H)$_3$, (A-E)$_3$ | (II-V)$_1$, (III-VI)$_1$ | (II-V)$_2$, (III-VI)$_2$ | (I-IV)$_3$, (II-V)$_3$ |
| (A-E)$_1$, (B-F)$_1$ | (A-E)$_2$, (B-F)$_2$ | (A-E)$_3$, (B-F)$_3$ | (II-V)$_1$, (III-VI)$_1$ | (II-V)$_2$, (III-VI)$_2$ | (II-V)$_3$, (III-VI)$_3$ |
| (B-F)$_1$, (C-G)$_1$ | (A-E)$_2$, (B-F)$_2$ | (A-E)$_3$, (B-F)$_3$ | (III-VI)$_1$, (I-IV)$_1$ | (II-V)$_2$, (III-VI)$_2$ | (II-V)$_3$, (III-VI)$_3$ |
| (B-F)$_1$, (C-G)$_1$ | (B-F)$_2$, (C-G)$_2$ | (A-E)$_3$, (B-F)$_3$ | (III-VI)$_1$, (I-IV)$_1$ | (III-VI)$_2$, (I-IV)$_2$ | (II-V)$_3$, (III-VI)$_3$ |
| (B-F)$_1$, (C-G)$_1$ | (B-F)$_2$, (C-G)$_2$ | (B-F)$_3$, (C-G)$_3$ | (III-VI)$_1$, (I-IV)$_1$ | (III-VI)$_2$, (I-IV)$_2$ | (III-VI)$_3$, (I-IV)$_3$ |
| (C-G)$_1$, (D-H)$_1$ | (B-F)$_2$, (C-G)$_2$ | (B-F)$_3$, (C-G)$_3$ | (I-IV)$_1$, (II-V)$_1$ | (III-VI)$_2$, (I-IV)$_2$ | (III-VI)$_3$, (I-IV)$_3$ |
| (C-G)$_1$, (D-H)$_1$ | (C-G)$_2$, (D-H)$_2$ | (B-F)$_3$, (C-G)$_3$ | (I-IV)$_1$, (II-V)$_1$ | (I-IV)$_2$, (II-V)$_2$ | (III-VI)$_3$, (I-IV)$_3$ |
| (C-G)$_1$, (D-H)$_1$ | (C-G)$_2$, (D-H)$_2$ | (C-G)$_3$, (D-H)$_3$ | (I-IV)$_1$, (II-V)$_1$ | (I-IV)$_2$, (II-V)$_2$ | (I-IV)$_3$, (II-V)$_3$ |
| (D-H)$_1$, (A-E)$_1$ | (C-G)$_2$, (D-H)$_2$ | (C-G)$_3$, (D-H)$_3$ | (II-V)$_1$, (III-VI)$_1$ | (I-IV)$_2$, (II-V)$_2$ | (I-IV)$_3$, (II-V)$_3$ |
| (D-H)$_1$, (A-E)$_1$ | (D-H)$_2$, (A-E)$_2$ | (C-G)$_3$, (D-H)$_3$ | (II-V)$_1$, (III-VI)$_1$ | (II-V)$_2$, (III-VI)$_2$ | (I-IV)$_3$, (II-V)$_3$ |
| (D-H)$_1$, (A-E)$_1$ | (D-H)$_2$, (A-E)$_2$ | (D-H)$_3$, (A-E)$_3$ | (II-V)$_1$, (III-VI)$_1$ | (II-V)$_2$, (III-VI)$_2$ | (II-V)$_3$, (III-VI)$_3$ |
| (A-E)$_1$, (B-F)$_1$ | (D-H)$_2$, (A-E)$_2$ | (D-H)$_3$, (A-E)$_3$ | (III-VI)$_1$, (I-IV)$_1$ | (II-V)$_2$, (III-VI)$_2$ | (II-V)$_3$, (III-VI)$_3$ |
| (A-E)$_1$, (B-F)$_1$ | (A-E)$_2$, (B-F)$_2$ | (D-H)$_3$, (A-E)$_3$ | (III-VI)$_1$, (I-IV)$_1$ | (III-VI)$_2$, (I-IV)$_2$ | (II-V)$_3$, (III-VI)$_3$ |
| (A-E)$_1$, (B-F)$_1$ | (A-E)$_2$, (B-F)$_2$ | (A-E)$_3$, (B-F)$_3$ | (III-VI)$_1$, (I-IV)$_1$ | (III-VI)$_2$, (I-IV)$_2$ | (III-VI)$_3$, (I-IV)$_3$ |
| (B-F)$_1$, (C-G)$_1$ | (A-E)$_2$, (B-F)$_2$ | (A-E)$_3$, (B-F)$_3$ | (I-IV)$_1$, (II-V)$_1$ | (III-VI)$_2$, (I-IV)$_2$ | (III-VI)$_3$, (I-IV)$_3$ |
| (B-F)$_1$, (C-G)$_1$ | (B-F)$_2$, (C-G)$_2$ | (A-E)$_3$, (B-F)$_3$ | (I-IV)$_1$, (II-V)$_1$ | (I-IV)$_2$, (II-V)$_2$ | (III-VI)$_3$, (I-IV)$_3$ |
| (B-F)$_1$, (C-G)$_1$ | (B-F)$_2$, (C-G)$_2$ | (B-F)$_3$, (C-G)$_3$ | (I-IV)$_1$, (II-V)$_1$ | (I-IV)$_2$, (II-V)$_2$ | (I-IV)$_3$, (II-V)$_3$ |
| (C-G)$_1$, (D-H)$_1$ | (B-F)$_2$, (C-G)$_2$ | (B-F)$_3$, (C-G)$_3$ | (II-V)$_1$, (III-VI)$_1$ | (I-IV)$_2$, (II-V)$_2$ | (I-IV)$_3$, (II-V)$_3$ |
| (C-G)$_1$, (D-H)$_1$ | (C-G)$_2$, (D-H)$_2$ | (B-F)$_3$, (C-G)$_3$ | (II-V)$_1$, (III-VI)$_1$ | (II-V)$_2$, (III-VI)$_2$ | (I-IV)$_3$, (II-V)$_3$ |
| (C-G)$_1$, (D-H)$_1$ | (C-G)$_2$, (D-H)$_2$ | (C-G)$_3$, (D-H)$_3$ | (II-V)$_1$, (III-VI)$_1$ | (II-V)$_2$, (III-VI)$_2$ | (II-V)$_3$, (III-VI)$_3$ |
| (D-H)$_1$, (A-E)$_1$ | (C-G)$_2$, (D-H)$_2$ | (C-G)$_3$, (D-H)$_3$ | (III-VI)$_1$, (I-IV)$_1$ | (II-V)$_2$, (III-VI)$_2$ | (II-V)$_3$, (III-VI)$_3$ |

ATTACHED TABLE 4-continued

| Stator energizing sequence | | | Rotor energizing sequence (corresponding) | | |
|---|---|---|---|---|---|
| First individual motor | Second individual motor | Third individual motor | First individual motor | Second individual motor | Third individual motor |
| (D-H)$_1$, (A-E)$_1$ | (D-H)$_2$, (A-E)$_2$ | (C-G)$_3$, (D-H)$_3$ | (III-VI)$_1$, (I-IV)$_1$ | (III-VI)$_2$, (I-IV)$_2$ | (II-V)$_3$, (III-VI)$_3$ |
| (D-H)$_1$, (A-E)$_1$ | (D-H)$_2$, (A-E)$_2$ | (D-H)$_3$, (A-E)$_3$ | (III-VI)$_1$, (I-IV)$_1$ | (III-VI)$_2$, (I-IV)$_2$ | (III-VI)$_3$, (I-IV)$_3$ |
| (A-E)$_1$, (B-F)$_1$ | (D-H)$_2$, (A-E)$_2$ | (D-H)$_3$, (A-E)$_3$ | (I-IV)$_1$, (II-V)$_1$ | (III-VI)$_2$, (I-IV)$_2$ | (III-VI)$_3$, (I-IV)$_3$ |
| (A-E)$_1$, (B-F)$_1$ | (A-E)$_2$, (B-F)$_2$ | (D-H)$_3$, (A-E)$_3$ | (I-IV)$_1$, (II-V)$_1$ | (I-IV)$_2$, (II-V)$_2$ | (III-VI)$_3$, (I-IV)$_3$ |
| (A-E)$_1$, (B-F)$_1$ | (A-E)$_2$, (B-F)$_2$ | (A-E)$_3$, (B-F)$_3$ | (I-IV)$_1$, (II-V)$_1$ | (I-IV)$_2$, (II-V)$_2$ | (I-IV)$_3$, (II-V)$_3$ |
| (B-F)$_1$, (C-G)$_1$ | (A-E)$_2$, (B-F)$_2$ | (A-E)$_3$, (B-F)$_3$ | (II-V)$_1$, (III-VI)$_1$ | (I-IV)$_2$, (II-V)$_2$ | (I-IV)$_3$, (II-V)$_3$ |

Attached Table 4 shows not only the cyclic energizing, but also the subdivision of step angle of the combined switched reluctance motor in this embodiment.

The invention claimed is:

1. An electric excitation method for an electric excitation permanent magnet switched reluctance motor having a rotor, position sensors, an excitation control power source and a stator having even number of stator switch components, the method comprising:

supplying power by the excitation control power source to M phase lines on the stator in sequence and cyclically;

stopping power supplying by the excitation control power source to phase (M−1) in a time period $TM_{stator}$ during which the excitation control power source supplies power to phase M of the stator switching component, wherein moment $t1_{stator\ on}$ and moment $t(M-1)_{stator\ off}$ are both in the time period $TM_{stator}$, where $t(M-1)_{stator\ off}$ is a moment of the excitation control power source stopping the power supplying to phase (M−1) of the stator, $t1_{stator\ on}$ is a moment of the excitation control power source starting the power supplying to phase 1 of the stator, and $\Delta t_{stator} = t(M-1)_{stator\ off} - t1_{stator\ on}$ is a time difference between $t1_{stator\ on}$ and $t(M-1)_{stator\ off}$;

only when $\Delta t_{stator}$ is not zero, simultaneously supplying power by the excitation control power source to three phases of stator switch components that are adjacent to phase M;

only when $\Delta t_{stator}$ is zero, simultaneously supplying power by the excitation control power source of two phases of the stator switch component that are adjacent to phase M;

sending position signals of stator and the rotor by the position sensors to the excitation control power source;

controlling, by the excitation control power source, start and end moment of supply power to each phase line of the stator; and controlling running status of the motor.

2. An electric excitation method for an electric excitation permanent magnet switched reluctance motor having a position sensor, an excitation control power source, a rotor having a switch component with two phases, and a stator having an even number of stator switch components, the method comprising:

supplying power by the excitation control power source to M phase lines on the stator in sequence and cyclically;

stopping power supplying by the excitation control power source to phase (M−1) in a time period $TM_{stator}$ during which the excitation control power source supplies power to phase M of the stator switching component, wherein moment $t1_{stator\ on}$ and moment $t(M-1)_{stator\ off}$ are both in the time period $TM_{stator}$, where $t(M-1)_{stator\ off}$ is a moment of the excitation control power source stopping the power supplying to phase (M−1) of the stator, $t1_{stator\ on}$ is a moment of the excitation control power source starting the power supplying to phase 1 of the stator, and $\Delta t_{stator} = t(M-1)_{stator\ off} - t1_{stator\ on}$ is a time difference between $t1_{stator\ on}$ and $t(M-1)_{stator\ off}$;

only when $\Delta t_{stator}$ is not zero, simultaneously supplying power by the excitation control power source to three phases of stator switch components that are adjacent to phase M;

only when $\Delta t_{stator}$ is zero, simultaneously supplying power by the excitation control power source to two phases of the stator switch component that are adjacent to phase M;

while supplying power to the stator, supplying power by the excitation control power source to N phase lines on the rotor in sequence and cyclically;

stopping the power supplying by the excitation control power source to the (N−1)th phase in a time period $TN_{rotor}$ during which the excitation control power source supplies power to phase N of the rotor, wherein moment $t1_{rotor\ on}$ and moment $t(N-1)_{rotor\ off}$ are both in the time period $TM_{rotor}$, where $t(N-1)_{rotor\ off}$ is a moment of the excitation control power source stopping the power supplying to phase (N−1), $t1_{rotor\ on}$ is a moment of the excitation control power source starting the power supplying to phase 1, and $\Delta t_{rotor} = t1_{rotor\ on} - t(N-1)_{rotor\ off}$ is a time difference between $t(N-1)_{rotor\ off}$ and $t1_{rotor\ on}$;

when $\Delta t_{rotor}$ is not zero, supplying power by the excitation control power source to one phase of the rotor switch component;

when $\Delta t_{rotor}$ is zero, simultaneously supplying power by the excitation control power source to both phases of the rotor switch component;

sending stator and rotor position signals by the position sensor to the excitation control power source;

controlling, by the excitation control power source, start and end time of supply power to phase lines of the motor stator and rotor; and controlling running status of the motor.

* * * * *